(12) United States Patent
Sakui et al.

(10) Patent No.: US 12,437,804 B2
(45) Date of Patent: *Oct. 7, 2025

(54) SEMICONDUCTOR ELEMENT MEMORY CELL AND SEMICONDUCTOR ELEMENT MEMORY DEVICE

(71) Applicant: Unisantis Electronics Singapore Pte. Ltd., Singapore (SG)

(72) Inventors: Koji Sakui, Tokyo (JP); Nozomu Harada, Tokyo (JP)

(73) Assignee: UNISANTIS ELECTRONICS SINGAPORE PTE. LTD., Singapore (SG)

( * ) Notice: Subject to any disclaimer, the term of this patent is extended or adjusted under 35 U.S.C. 154(b) by 224 days.

This patent is subject to a terminal disclaimer.

(21) Appl. No.: 18/228,447

(22) Filed: Jul. 31, 2023

(65) Prior Publication Data

US 2023/0377636 A1 Nov. 23, 2023

Related U.S. Application Data

(63) Continuation-in-part of application No. PCT/JP2021/003695, filed on Feb. 2, 2021.

(51) Int. Cl.
*G11C 11/4096* (2006.01)
*H10B 12/00* (2023.01)

(52) U.S. Cl.
CPC .......... *G11C 11/4096* (2013.01); *H10B 12/20* (2023.02)

(58) Field of Classification Search
CPC ........ G11C 11/4096; G11C 2211/4016; G11C 11/404; G11C 16/04; H10B 12/20; H10D 30/021

(Continued)

(56) References Cited

U.S. PATENT DOCUMENTS 11,990,204 B2 * 5/2024 Sakui .................... G11C 11/404
2006/0049444 A1 3/2006 Shino
(Continued)

FOREIGN PATENT DOCUMENTS

JP H02188966 A 7/1990
JP H03171768 A 7/1991
(Continued)

OTHER PUBLICATIONS

Written Opinion of the International Searching Authority in International Application No. PCT/JP2021/003695, dated Mar. 30, 2021 (3 pages).

(Continued)

*Primary Examiner* — Huan Hoang
(74) *Attorney, Agent, or Firm* — Crowell & Moring LLP

(57) ABSTRACT

By controlling voltages applied to plate lines, word lines, source lines, and bit lines, a memory device that uses semiconductor elements performs a data retention operation of holding positive hole groups formed by an impact ionization phenomenon or by a gate-induced drain leakage current in a semiconductor base material, and a memory erase operation of removing positive hole groups from inside the semiconductor base material. The memory device also performs a data erase operation during the memory erase operation to remove positive hole groups from inside the semiconductor base material of all the memory cells in a block made up of the memory cells, which are arrayed in a matrix.

11 Claims, 17 Drawing Sheets

(58) Field of Classification Search
USPC .................................................. 365/189.011
See application file for complete search history.

(56) References Cited

U.S. PATENT DOCUMENTS

2008/0212366 A1   9/2008   Ohsawa
2016/0307632 A1*  10/2016  Lee .................. H01L 23/53271

FOREIGN PATENT DOCUMENTS

| JP | 2006-80280 A | 3/2006 |
|---|---|---|
| JP | H3957774 | 5/2007 |
| JP | 2008-218556 | 9/2008 |

OTHER PUBLICATIONS

Takato, H., et al., "Impact of Surrounding Gate Transistor (SGT) for Ultra-High-Density LSI's", *IEEE Transactions on Electron Devices*, vol. 38, No. 3, Mar. 1991, pp. 573-578 (6 pages).

Chung, H., et al., "Novel 4F² DRAM Cell with Vertical Pillar Transistor(VPT)" *2011 Proceedings of the European Solid-State Device Research Conference* (2011) (4 pages).

Wong, H.S., P., et al., "Phase Change Memory" *Proceedings of the IEEE*, vol. 98, No. 12, Dec. 2010, pp. 2201-2227 (27 pages).

Tsunoda, K., et al., "Low Power and High Speed Switching of Ti-doped NiO ReRAM under the Unipolar Voltage Source of less than 3 V" IEDM (2007) pp. 767-770, (4 pages).

Kang, W., et al., "Reconfigurable Codesign of STT-MRAM Under Process Variations in Deeply Scaled Technology" *IEEE Transactions on Electron Devices*, vol. 62, No. 6, Jun. 2015, pp. 1769-1777 (9 pages).

Ertosun, M. G., et al., "Novel Capacitorless Single-Transistor Charge-Trap DRAM 1T CT DRAM) Utilizing Electrons" *IEEE Electron Device Letters*, vol. 31, No. 5, May 2010, pp. 405-407 (3 pages).

Wan, J., et al., "A Compact Capacitor-Less High-Speed DRAM Using Field Effect-Controlled Charge Regeneration" *IEEE Electron Device Letters*, vol. 33, No. 2, Feb. 2012, pp. 179-181 (3 pages).

Ohsawa, T., et al., "Memory Design Using a One-Transistor Gain Cell on SOI", *IEEE Journal of Solid-State Circuits*, vol. 37, No. 11, Nov. 2022, pp. 1510-1522 (13 pages).

Shino, T., et al., "Floating Body RAM Technology and its Scalability to 32nm Node and Beyond", IEEE IEDM (2006) (4 pages).

Yoshida, E., et al., "A Design of a Capacitorless 1T-DRAM Cell Using Gate-induced Drain Leakage (GIDL) Current for Low-power and High-speed Embedded Memory" IEEE IEDM, pp. 913-916, Dec. 2003 (4 pages).

Song, J., et al., "Design Optimization of Gate-All-Around (GAA) MOSFETs" *IEEE Transactions on Nanotechnology*, vol. 5, No. 3, pp. 186-191, May 2006 (7 pages).

Loubet, N., et al., "Stacked Nanosheet Gate-All-Around Transistor to Enable Scaling Beyond FinFET" *2017 Symposium on VLSI Technology Digest of Technical Pagers*, T230-T231, Jun. 2017 (2 pages).

Jiang, H., et al., "Experimental Investigation of Self-Heating Effect (SHE) in Multiple-Fin SOI FinFETS" *Semicond. Sci. Technol.* 29 (2014) 115021 (9 pages).

Yoshida, E., et al., "A Capacitorless 1T-DRAM Technology Using Gate-Induced Drain-Leakage (GIDL) Current for Low-Power and High-Speed Embedded Memory" *IEEE Transactions on Electron Devices*, vol. 53, No. 4, Apr. 2006 (6 pages).

\* cited by examiner

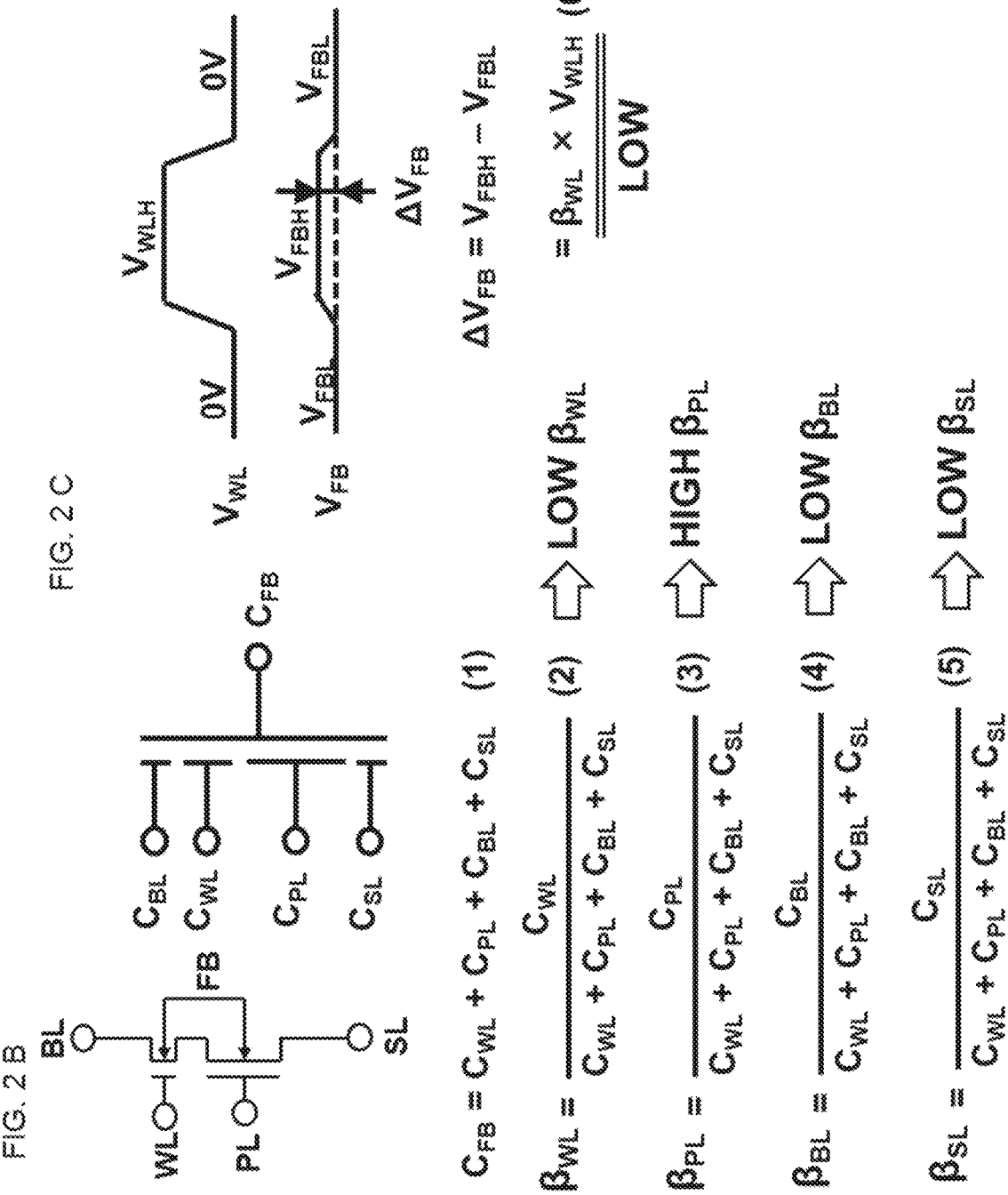

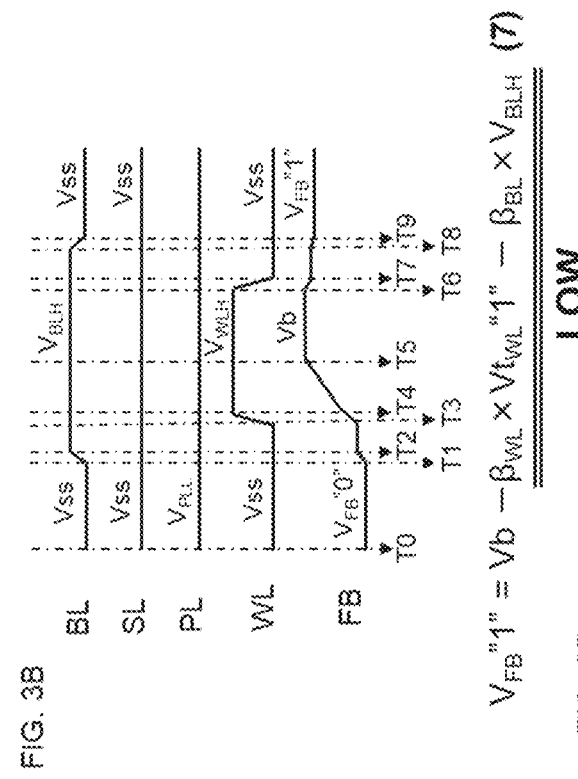
FIG. 3A "1" WRITING OPERATION
SOURCE-SIDE IMPACT IONIZATION
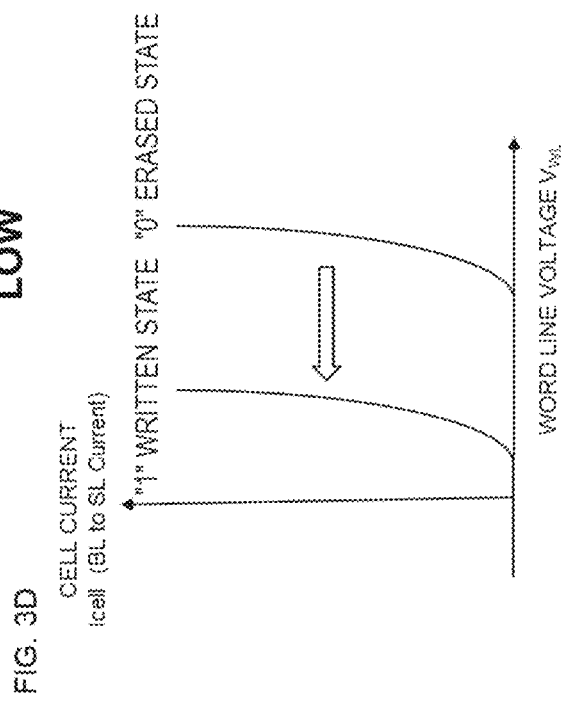
FIG. 3B
$$V_{FB}"1" = Vb - \beta_{WL} \times Vt_{WL}"1" - \beta_{BL} \times V_{BLH} \quad (7)$$
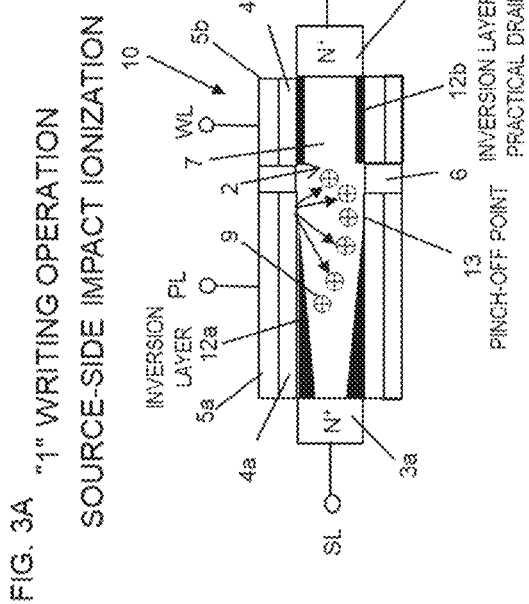
FIG. 3C "1" WRITTEN STATE
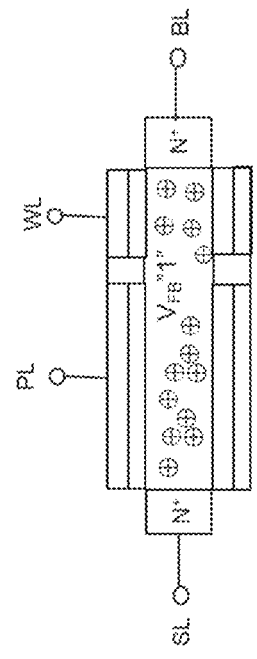
FIG. 3D

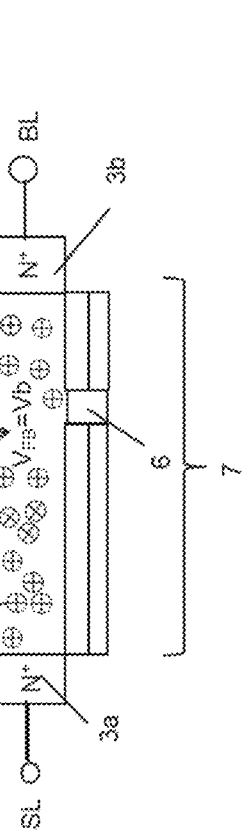
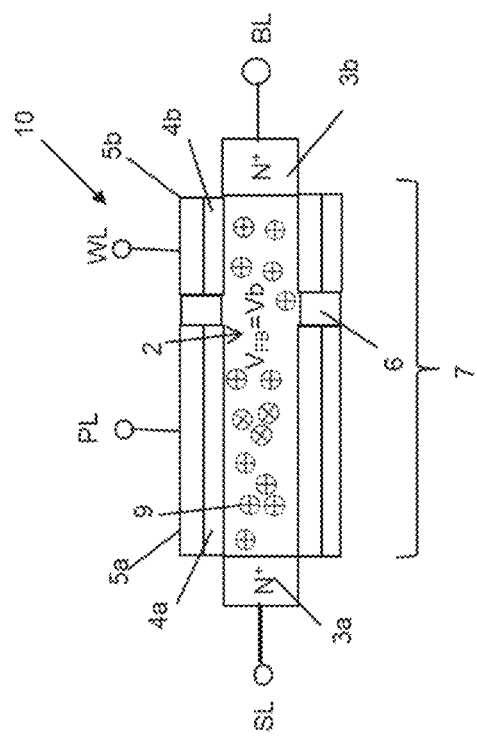
FIG. 4AA  "1" WRITTEN STATE
FIG. 4AB  "0" ERASED STATE
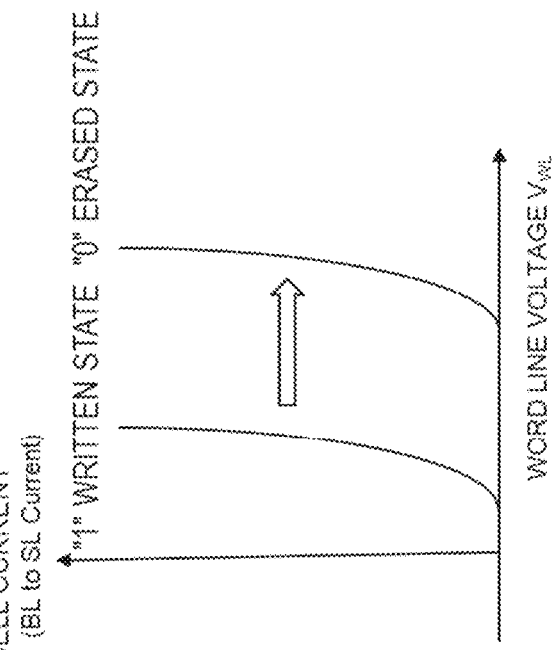
FIG. 4AC

FIG. 4B

ERASE OPERATION

| | SIGNAL LINE | APPLIED VOLTAGE |
|---|---|---|
| "0" ERASING | BIT LINE BL | FLOATING OR $V_{ERA}$ (EXAMPLE: -3 V) |
| | SOURCE LINE SL | $V_{ERA}$ (EXAMPLE: -3 V) |
| | PLATE LINE PL | $V_{PLL}$ (EXAMPLE: 2 V) |
| | WORD LINE WL | $V_{SS}$ (EXAMPLE: 0 V) |
| | FLOATING BODY FB | $V_{ERA} + V_b$ (EXAMPLE: -3 V + 0.7 V = -2.3 V) |

$V_b$: BUILT-IN VOLTAGE OF PN JUNCTION: TO 0.7 V

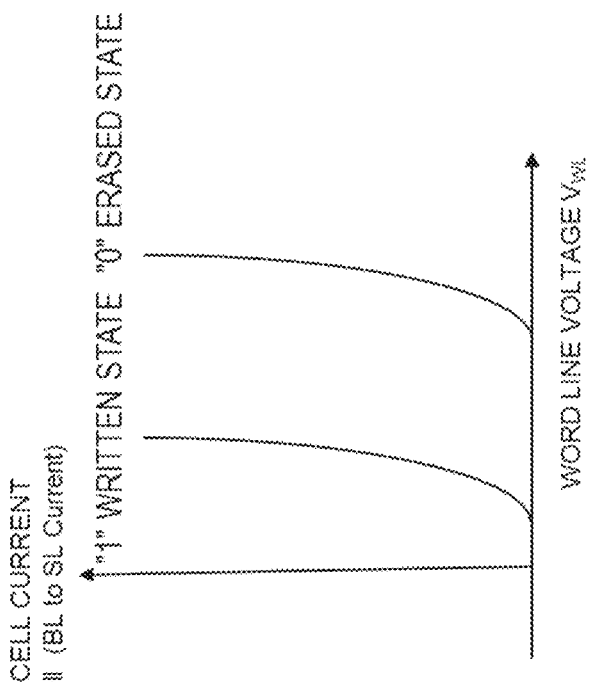
FIG. 5C
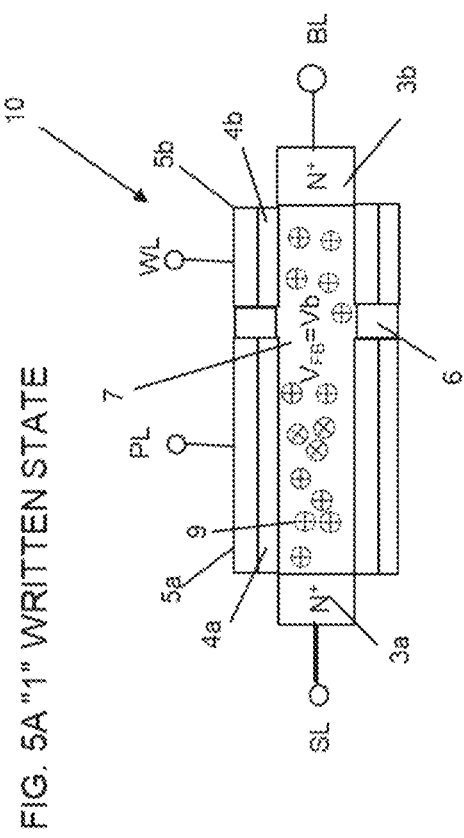
FIG. 5A "1" WRITTEN STATE
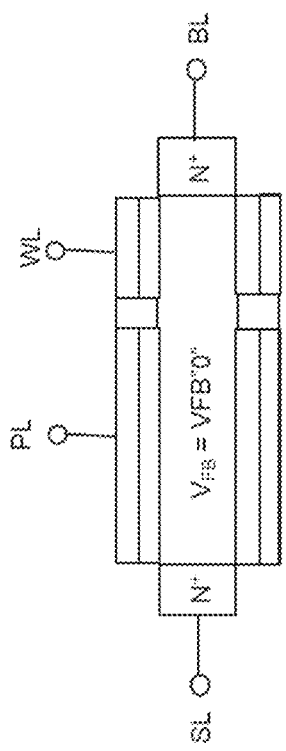
FIG. 5B "0" ERASED STATE

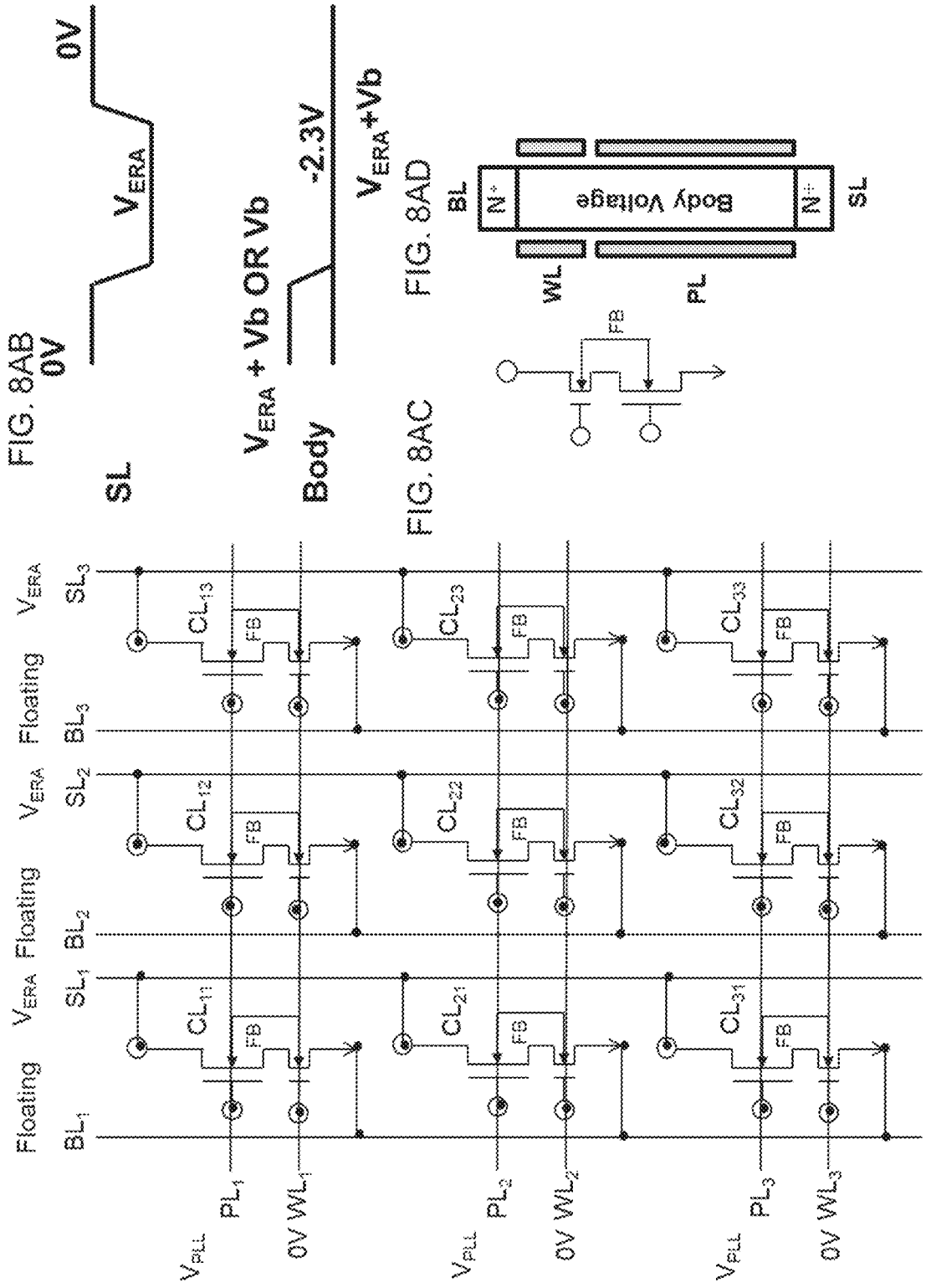

FIG. 8B

BLOCK ERASE Block Erase

| SELECT/NON-SELECT | SIGNAL LINE | APPLIED VOLTAGE |
|---|---|---|
| BLOCK TO BE "0" ERASED | BIT LINE BL | FLOATING OR $V_{ERA}$ (EXAMPLE: −3 V) |
| | SOURCE LINE SL | $V_{ERA}$ (EXAMPLE: −3V) |
| | PLATE LINE PL | $V_{PLL}$ (EXAMPLE: 2V) |
| | WORD LINE WL | $V_{SS}$ (EXAMPLE: 0V) |
| | FLOATING BODY FB | $V_{ERA}$ + Vb (EXAMPLE: −3V+0.7V = −2.3V) |
| BLOCK NOT TO BE ERASED (RECORD DATA RETENTION BLOCK) | BIT LINE BL | $V_{SS}$ (EXAMPLE: 0V) |
| | SOURCE LINE SL | $V_{SS}$ (EXAMPLE: 0V) |
| | PLATE LINE PL | $V_{PLL}$ (EXAMPLE: 2V) |
| | WORD LINE WL | $V_{SS}$ (EXAMPLE: 0V) |
| | FLOATING BODY FB | $V_{SS}$ (EXAMPLE: 0V) |

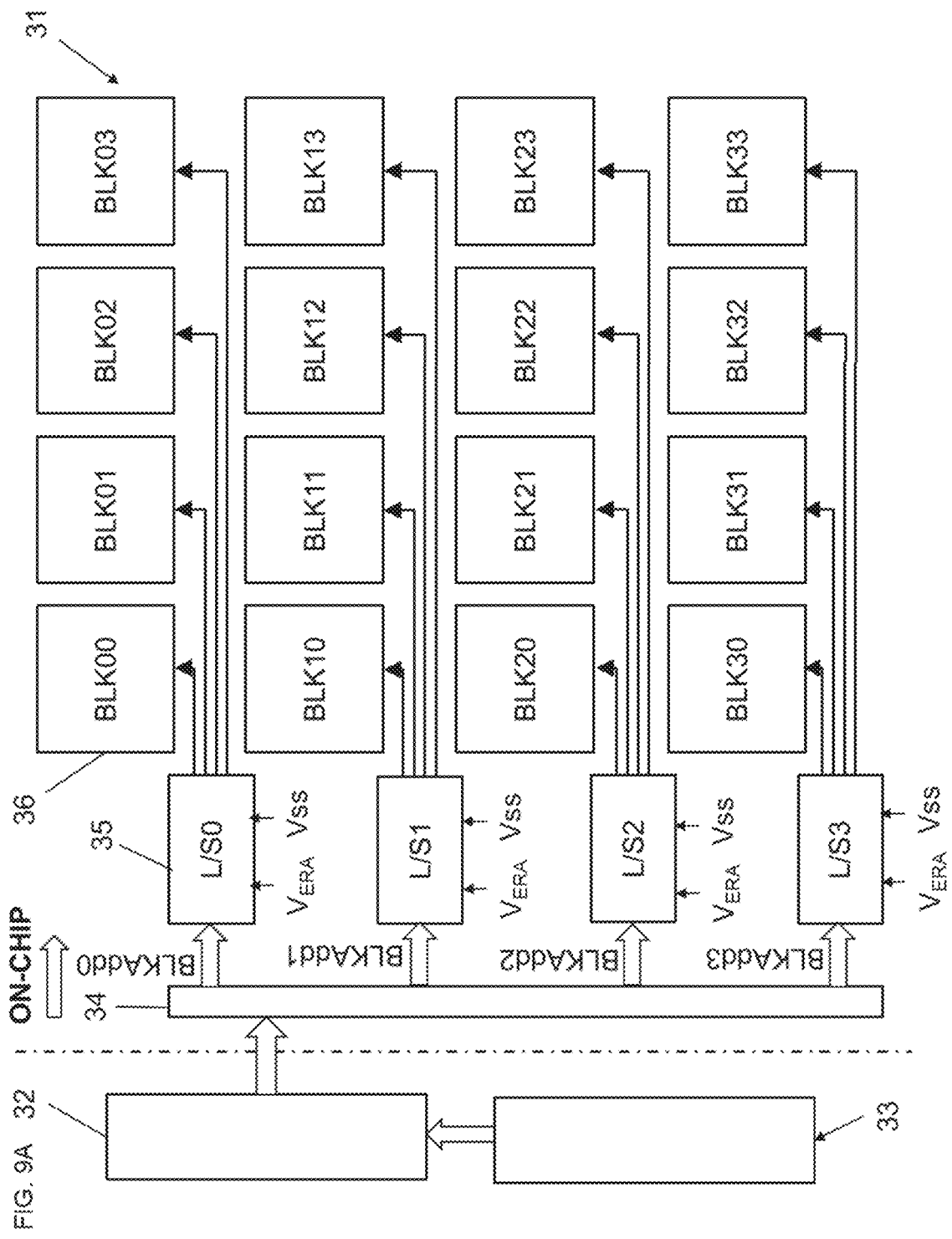

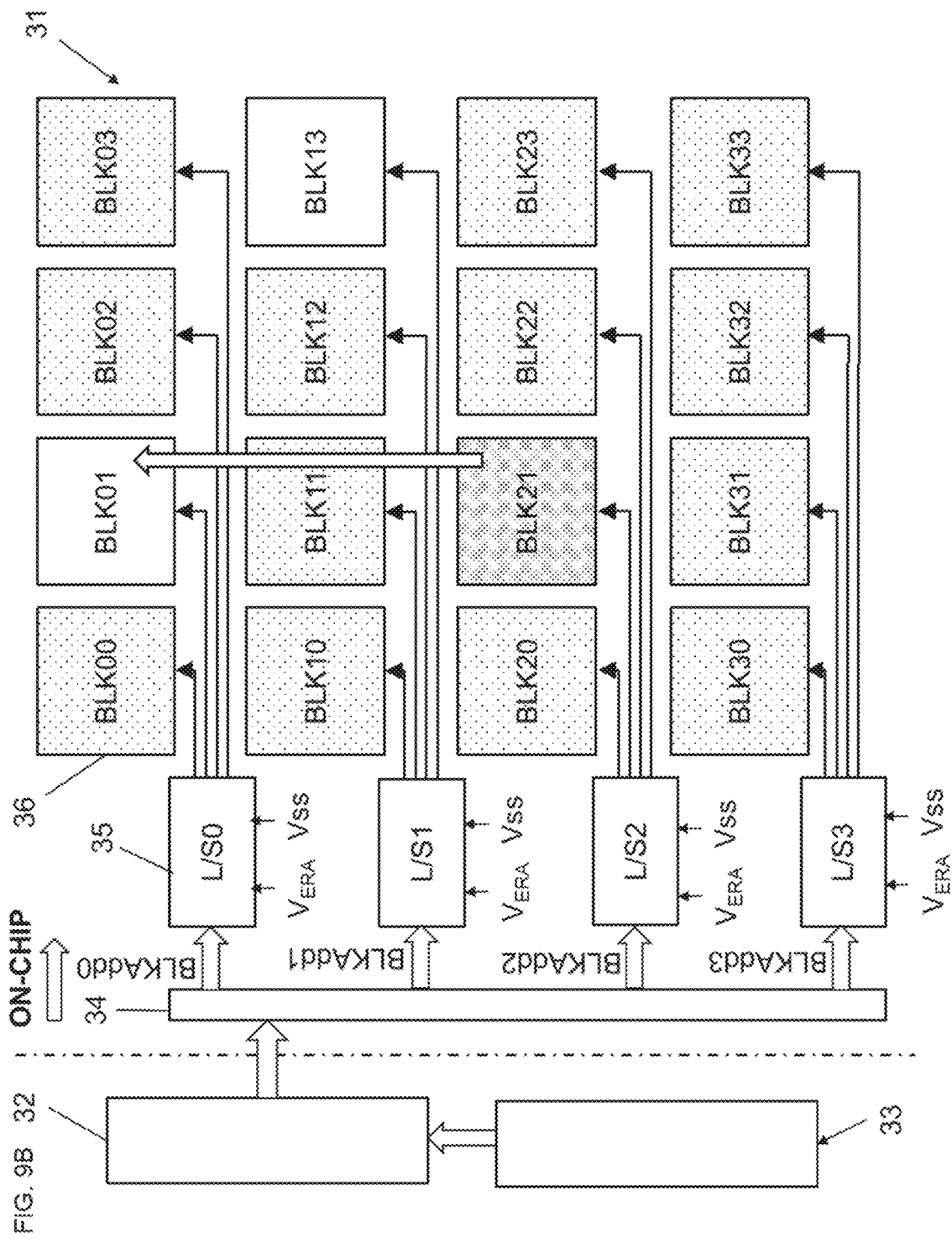

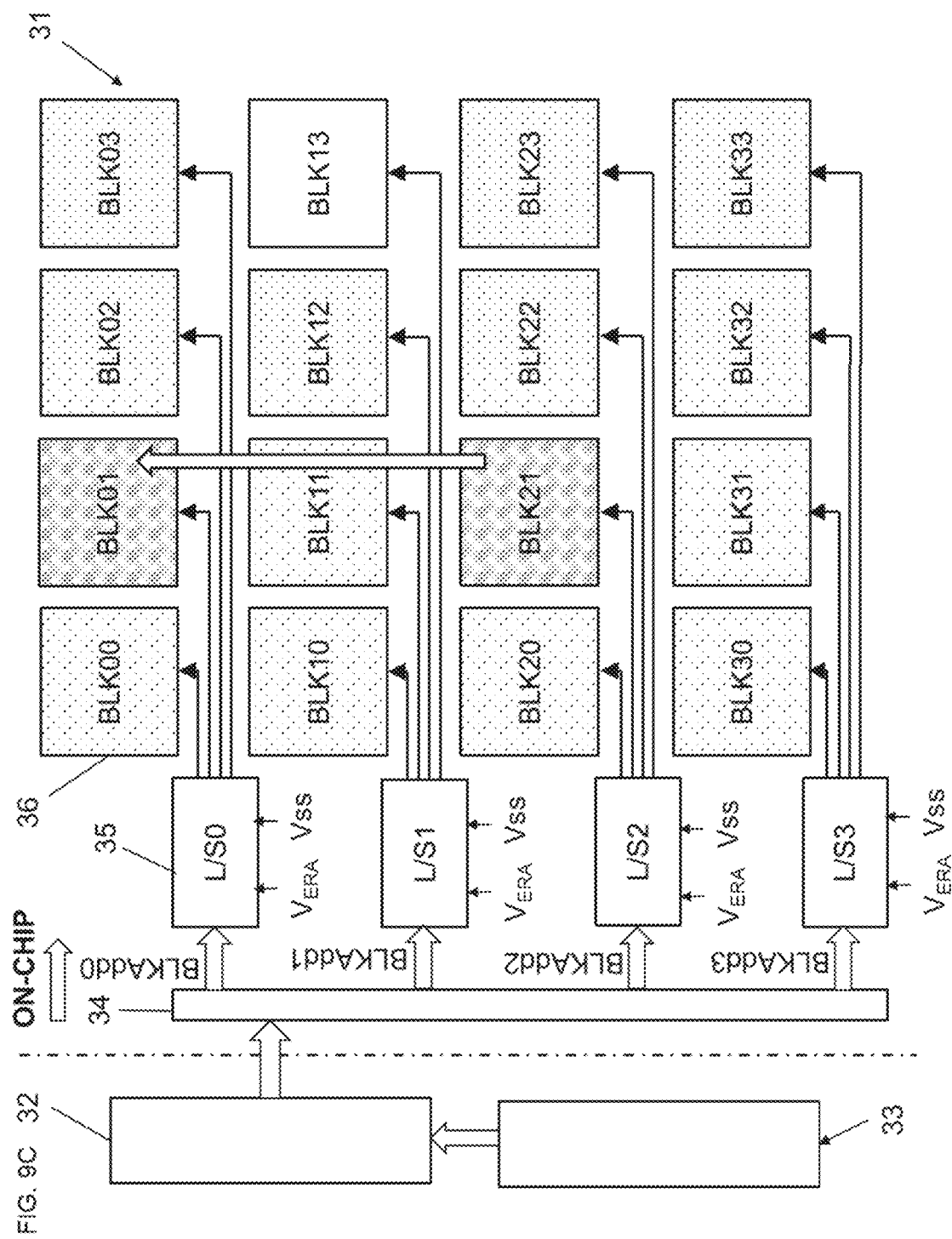

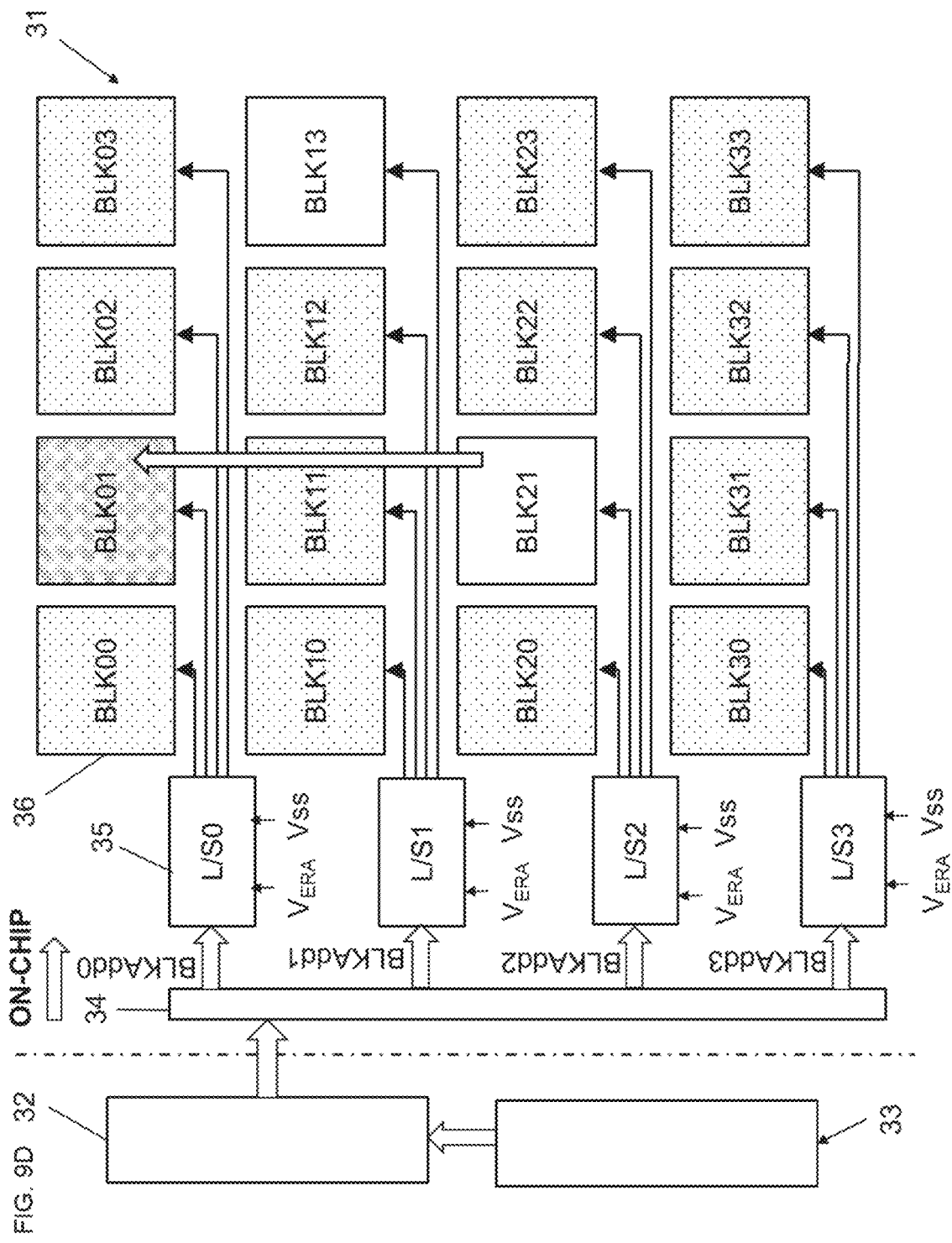

SEMICONDUCTOR ELEMENT MEMORY CELL AND SEMICONDUCTOR ELEMENT MEMORY DEVICE

INCORPORATION BY REFERENCE

The present application is a Continuation-In-Part application of PCT/JP2021/003695, filed Feb. 2, 2021, the entire contents of which are incorporated herein by reference.

BACKGROUND OF THE INVENTION

Field of the Invention

The present invention relates to a semiconductor element memory cell and a semiconductor element memory device that use semiconductor elements.

Description of the Related Art

Recently, there has been demand for greater packaging density and higher performance of memory elements in the development of LSI (Large Scale Integration) technology.

In normal planar MOS transistors, a channel extends in a horizontal direction along an upper surface of a semiconductor substrate. In contrast, a channel of SGTs extends in a vertical direction along an upper surface of a semiconductor substrate (see, for example, Japanese Patent Laid-Open No. 2-188966 and Hiroshi Takato, Kazumasa Sunouchi, Naoko Okabe, Akihiro Nitayama, Katsuhiko Hieda, Fumio Horiguchi, and Fujio Masuoka: IEEE Transaction on Electron Devices, Vol. 38, No. 3, pp. 573-578 (1991)). Consequently, the SGTs allow higher packaging density of a semiconductor device than do the planar MOS transistors. The use of the SGTs as selection transistors allows greater packaging density of DRAMs (Dynamic Random Access Memories; see, for example, H. Chung, H. Kim, H. Kim, K. Kim, S. Kim, K. Dong, J. Kim, Y. C. Oh, Y. Hwang, H. Hong, G. Jin, and C. Chung: "4F2 DRAM Cell with Vertical Pillar Transistor (VPT)," 2011 Proceeding of the European Solid-State Device Research Conference, (2011)) connected with capacitors, PCMs (Phase Change Memories; see, for example, H. S. Philip Wong, S. Raoux, S. Kim, Jiale Liang, J. R. Reifenberg, B. Rajendran, M. Asheghi and K. E. Goodson: "Phase Change Memory," Proceeding of IEEE, Vol. 98, No 12, December, pp. 2201-2227 (2010)) connected with variable resistance elements, RRAMs (Resistive Random Access Memories; see, for example, T. Tsunoda, K. Kinoshita, H. Noshiro, Y. Yamazaki, T. Iizuka, Y. Ito, A. Takahashi, A. Okano, Y. Sato, T. Fukano, M. Aoki, and Y. Sugiyama: "Low Power and High Speed Switching of Ti-doped NiO ReRAM under the Unipolar Voltage Source of less than 3V," IEDM (2007)), and MRAMs (Magneto-resistive Random Access Memories; see, for example, W. Kang, L. Zhang, J. Klein, Y. Zhang, D. Ravelosona, and W. Zhao: "Reconfigurable Codesign of STT-MRAM Under Process Variations in Deeply Scaled Technology," IEEE Transaction on Electron Devices, pp. 1-9 (2015) that varies resistance by changing magnetic spin direction by means of current. There is also a DRAM memory cell (see J. Wan, L. Rojer, A. Zaslavsky, and S. Critoloveanu: "A Compact Capacitor-Less High-Speed DRAM Using Field Effect-Controlled Charge Regeneration," Electron Device Letters, Vol. 35, No. 2, pp. 179-181 (2012)) made up of a single MOS transistor without a capacitor. The present application relates to a dynamic flash memory that can be made up of MOS transistors without a variable resistance element or a capacitor.

FIGS. 10A to 10D show a write operation of the above-mentioned capacitorless DRAM memory cell made up of a single MOS transistor, FIGS. 11A and 11B show problems in operations, and FIGS. 12A to 12C show read operations (see, for example, J. Wan, L. Rojer, A. Zaslavsky, and S. Critoloveanu: "A Compact Capacitor-Less High-Speed DRAM Using Field Effect-Controlled Charge Regeneration," Electron Device Letters, Vol. 35, No. 2, pp. 179-181 (2012); T. Ohsawa, K. Fujita, T. Higashi, Y. Iwata, T. Kajiyama, Y. Asao, and K. Sunouchi: "Memory design using a one-transistor gain cell on SOI," IEEE JSSC, vol. 37, No. 11, pp 1510-1522 (2002); T. Shino, N. Kusunoki, T. Higashi, T. Ohsawa, K. Fujita, K. Hatsuda, N. Ikumi, F. Matsuoka, Y. Kajitani, R. Fukuda, Y. Watanabe, Y. Minami, A. Sakamoto, J. Nishimura, H. Nakajima, M. Morikado, K. Inoh, T. Hamamoto, A. Nitayama: "Floating Body RAM Technology and its Scalability to 32 nm Node and Beyond," IEEE IEDM (2006); and E. Yoshida: "A Capacitorless 1T-DRAM Technology Using Gate-Induced Drain-Leakage (GIDL) Current for Low-Power and High-Speed Embedded Memory," IEEE IEDM (2006)). FIG. 10A shows a "1" written state. Here, the memory cell is formed on an SOI substrate 100, made up of a source $N^+$ layer 103 (hereinafter a semiconductor region containing a high concentration of donor impurities will be referred to as an "$N^+$ layer") connected with a source line SL, a drain $N^+$ layer 104 connected with a bit line BL, a gate conductive layer 105 connected with a word line WL, and a floating body 102 of a MOS transistor 110. That is, a DRAM memory cell is made up of a single MOS transistor 110 without a capacitor. Note that a $SiO_2$ layer 101 of the SOI substrate is placed in contact with an undersurface of the floating body 102. When "1" is written into the memory cell made up of the single MOS transistor 110, the MOS transistor 110 is operated in a saturation region. That is, an electron channel 107 extending from the source $N^+$ layer 103 has a pinch-off point 108 and does not reach the drain $N^+$ layer 104 connected with a bit line. If the MOS transistor 110 is operated with a gate voltage set to approximately ½ a drain voltage by applying high voltages to the bit line BL connected to the drain $N^+$ layer and the word line WL connected to the gate conductive layer 105 as described above, electric field strength is maximized at the pinch-off point 108 in the vicinity of the drain $N^+$ layer 104. As a result, accelerated electrons flowing from the source $N^+$ layer 103 towards the drain $N^+$ layer 104 collide with a Si lattice, and electron-hole pairs are created by kinetic energy lost at that moment. Most of the generated electrons (not shown) reach the drain $N^+$ layer 104. Only a few very hot electrons reach the gate conductive layer 105 by jumping over a gate oxide film 109. Positive holes 106 generated at the same time charge the floating body 102. In this case, the generated positive holes 106 contribute as an increment to majority carriers because the floating body 102 is made of p-type Si. The floating body 102 is filled with the generated positive holes 106, and if a voltage of the floating body 102 becomes higher than the source $N^+$ layer 103 by Vb or more, positive holes generated further are discharged to the source $N^+$ layer 103, where Vb is a built-in voltage of a pn junction between the source $N^+$ layer 103 and the floating body 102 in a p-layer, and is approximately 0.7 V. FIG. 10B shows how the floating body 102 is charged to saturation by the generated positive holes 106.

Next, a "0" writing operation of a memory cell 110 will be described using FIG. 10C. There are a memory cell 110 that writes "1" and a memory cell 110 that writes "0" randomly to a common select word line WL. FIG. 10C shows how a "1" written state is changed to a "0" written state. To write "0," the voltage of bit line BL is negatively biased and a pn junction between the drain N⁺ layer 104 and the floating body 102 in the p-layer is forward biased. As a result, positive holes 106 generated in the floating body 102 beforehand in the previous cycle flows to the drain N⁺ layer 104 connected to the bit line BL. Once the write operation finishes, two states of the memory cell follow: a state in which the memory cell 110 is filled with the generated positive holes 106 (FIG. 10B) and a state in which the generated positive holes are discharged from the memory cell 110 (FIG. 10C). The floating body 102 of the memory cell 110 filled with the positive holes 106 is higher in potential than the floating body 102 free of generated positive holes. Therefore, a threshold voltage of the memory cell 110 written with "1" is lower than a threshold voltage of the memory cell 110 written with "0." FIG. 10D shows how this looks like.

Next, problems in operations of the memory cell made up of a single MOS transistor 110 will be described using FIGS. 11A and 11B. As shown in FIG. 11A, capacitance $C_{FB}$ of the floating body is the sum total of capacitance $C_{WL}$ between a gate connected with a word line and the floating body, junction capacitance $C_{SL}$ of a pn junction between the source N⁺ layer 103 connected with a source line and the floating body 102, and junction capacitance $C_{BL}$ of a pn junction between the drain N⁺ layer 104 connected with the bit line and the floating body 102; and is given by $$C_{FB}=C_{WL}+C_{BL}+C_{SL} \quad (8)$$

A capacitive coupling ratio $\beta_{WL}$ between the gate connected with a word line and the floating body is given by $$\beta_{WL}=C_{WL}/(C_{WL}+C_{BL}+C_{SL}) \quad (9)$$

Therefore, if a word line voltage $V_{WL}$ swings during reading or writing, a voltage of the floating body 102 serving as a memory node (contact) of the memory cell is also affected. FIG. 11B shows how this looks like. If a word line voltage $V_{WL}$ rises from 0 V to $V_{WLH}$ during reading or writing, a voltage $V_{FB}$ of the floating body 102 rises from $V_{FB1}$ to $V_{FB2}$ due to capacitive coupling with the word line, where $V_{FB1}$ is an initial voltage before the word line voltage changes. The amount of change $\Delta V_{FB}$ in voltage is given by $$\Delta V_{FB}=V_{FB2}-V_{FB1}=\beta_{WL} \times V_{WLH} \quad (10)$$

In $\beta_{WL}$ in Eq. (9), a contribution ratio of $C_{WL}$ is large, and is expressed, for example, by $C_{WL}:C_{BL}:C_{SL}=8:1:1$. In this case, $\beta_{WL}=0.8$. If the word line, for example, is 5 V during writing and 0 V after the end of writing, due to capacitive coupling of the word line WL and floating body 102, the floating body 102 is subjected to amplitude noise as high as 5 V×$\beta_{WL}$=4 V. This poses a problem in that a sufficient margin of potential difference between a logic 1 potential and logic 0 potential of the floating body 102 cannot be secured during writing.

FIGS. 12A to 12C show a read operation, where FIG. 12A shows a "1" written state and FIG. 12B shows a "0" written state. Actually, however, even if Vb is written into the floating body 102 by writing of "1," if the word line returns to 0 V when the writing is finished, the floating body 102 is lowered to a negative bias. When "0" is being written, because the floating body 102 is negatively biased further, a sufficiently large margin of potential difference cannot be secured between "1" and "0" as shown in FIG. 12C, making it difficult to commercially introduce really capacitorless DRAM memory cells.

A capacitorless single-transistor DRAM (gain cell) has a problem in that there is large capacitive coupling between a word line and a floating body and if potential of the word line swings during data read or write, the swings are transmitted as noise directly to the floating body. This causes misreading or erroneous rewriting of storage data, making it difficult to put the capacitorless single-transistor DRAM (gain cell) to practical use.

SUMMARY OF THE INVENTION

To solve the above problem, a semiconductor element memory cell according to a first aspect of the present invention comprises:
a first impurity well layer formed on a substrate;
a second impurity well layer formed in the first impurity well layer;
semiconductor base material erected in a vertical direction or extended in a horizontal direction of the substrate by being formed on the second impurity well layer;
a first impurity region and a second impurity region provided on opposite ends of the semiconductor base material;
a gate insulating layer placed in contact with a lateral surface of the semiconductor base material between the first impurity region and the second impurity region;
a first gate conductor layer covering part or all of the gate insulating layer; and
a second gate conductor layer located adjacent to the first gate conductor layer and placed in contact with a lateral surface of the gate insulating layer,
wherein positive hole groups generated by an impact ionization phenomenon or by a gate-induced drain leakage current are held in the semiconductor base material by controlling voltages applied to the first gate conductor layer, the second gate conductor layer, the first impurity region, and the second impurity region,
a memory write operation is performed by setting a voltage of the semiconductor base material to a first data retention voltage higher than a voltage of the first impurity region and/or the second impurity region, and
a memory erase operation is performed by controlling voltages applied to the first impurity region, the second impurity region, the first gate conductor layer, and the second gate conductor layer and thereby extracting a residual positive hole group out of the positive hole groups from one or both of the first impurity region and the second impurity region to set the voltage of the semiconductor base material to a second data retention voltage lower than the first data retention voltage (first aspect).

In the first aspect of the present invention, the substrate is a p-type semiconductor substrate, the first impurity well layer is an n-type semiconductor layer, and the second impurity well layer is a p-type semiconductor layer; and a negative voltage is applied to the p-type second impurity well layer during the memory erase operation (second aspect).

In the first aspect of the present invention, first gate capacitance between the first gate conductor layer and the semiconductor base material is higher than second gate capacitance between the second gate conductor layer and the semiconductor base material (third aspect).

In a semiconductor element memory device according to the present invention, the memory erase operation according to the first aspect is performed with respect to the semiconductor element memory cell by extracting a residual positive hole group out of the positive hole groups from one or both of the first impurity region and the second impurity region (fourth aspect).

In the first aspect of the present invention, the first impurity region is connected to a source line, the second impurity region is connected to a bit line, and one of the first gate conductor layer and the second gate conductor layer is connected to a word line and another is connected to a drive control line; and using voltages applied to the source line, the bit line, the drive control line, and the word line, the memory erase operation and the memory write operation are performed selectively (fifth aspect).

In the first aspect of the present invention, a plurality of the semiconductor element memory cells is arrayed in a matrix, forming a block;

the semiconductor element memory device further comprises a logical-physical conversion table configured to bring a physical address and a logical address of the block into correspondence with each other, and a controller circuit configured to manage the logical-physical conversion table; and one or both of the logical-physical conversion table and the controller circuit is/are provided within or outside the block (sixth aspect).

In the sixth aspect of the present invention, a block erase operation involves applying an erase voltage to all source lines in the block and thereby putting the bit line in a floating state (seventh aspect).

In the seventh aspect of the present invention, at least one block according to the seventh aspect is provided; the semiconductor element memory device further comprises an erase voltage generator circuit and a level conversion circuit; and in the block erase operation, either an erase voltage outputted from the erase voltage generator circuit is applied to one or both of the first impurity region and the second impurity region in the selectively erased first block via the level conversion circuit and a residual positive hole group is extracted from the positive hole groups, thereby performing the block erase operation, or a ground voltage is applied to one or both of the first impurity region and the second impurity region in the second block which is not erased selectively, via the level conversion circuit, thereby not to perform the block erase operation (eighth aspect).

In the first aspect of the present invention, one or both of the first gate conductor layer and the second gate conductor layer are divided into two or more separate gate conductor layers in planar view or in a vertical direction and the separate gate conductor layers are operated synchronously or asynchronously (ninth aspect).

In the ninth aspect of the present invention, in the vertical direction, either the separate gate conductor layers of the first gate conductor layer are placed on opposite sides of the second gate conductor layer, or the separate gate conductor layers of the second gate conductor layer are placed on opposite sides of the first gate conductor layer (tenth aspect).

In the seventh aspect of the present invention, the source lines are connected commonly in the block to perform the block erase operation (eleventh aspect).

BRIEF DESCRIPTION OF THE DRAWINGS

FIGS. 2A, 2B and 2C are diagrams explaining effects produced when gate capacitance of a first gate conductor layer 5*a* connected to a plate line PL of the memory device having the SGT according to the first embodiment is made higher than gate capacitance of a second gate conductor layer 5*b* connected with a word line WL;

FIGS. 3A, 3B, 3C and 3D are diagrams for explaining a write operation mechanism of the memory device having the SGT according to the first embodiment;

FIGS. 4AA, 4AB and 4AC are diagrams for explaining an erase operation mechanism of the memory device having the SGT according to the first embodiment;

FIG. 4B is a diagram for explaining the erase operation mechanism of the memory device having the SGT according to the first embodiment;

FIGS. 5A, 5B and 5C are diagrams for explaining a read operation mechanism of the memory device having the SGT according to the first embodiment;

FIGS. 8AA, 8AB, 8AC and 8AD are diagrams for explaining a block erase operation of a dynamic flash memory circuit according to a third embodiment;

FIG. 8B is a diagram for explaining the block erase operation of the dynamic flash memory circuit according to the third embodiment;

FIG. 9A is a diagram for explaining block rewrite and block erase operations of a dynamic flash memory circuit according to a fourth embodiment;

FIG. 9B is a diagram for explaining the block rewrite and block erase operations of the dynamic flash memory circuit according to the fourth embodiment;

FIG. 9C is a diagram for explaining the block rewrite and block erase operations of the dynamic flash memory circuit according to the fourth embodiment;

FIG. 9D is a diagram for explaining the block rewrite and block erase operations of the dynamic flash memory circuit according to the fourth embodiment;

DETAILED DESCRIPTION OF THE PREFERRED EMBODIMENTS

Embodiments of a semiconductor memory device (hereinafter referred to as a dynamic flash memory) according to the present invention will be described below with reference to the drawings.

First Embodiment

A structure and operation mechanism of a dynamic flash memory cell according to a first embodiment of the present invention will be described below using FIGS. 1 to 6. The structure of the dynamic flash memory cell will be described using FIG. 1. Then, using FIGS. 2A to 2C, description will be given of effects produced when gate capacitance of a first gate conductor layer 5*a* connected to a plate line PL is made higher than gate capacitance of a second gate conductor layer 5b connected with a word line WL. Then, a data write operation mechanism will be described using FIGS. 3A to 3D, a data erase operation mechanism will be described using FIGS. 4AA to 4B, and a data read operation mechanism will be described using FIGS. 5A to 5C.

Figure 1:
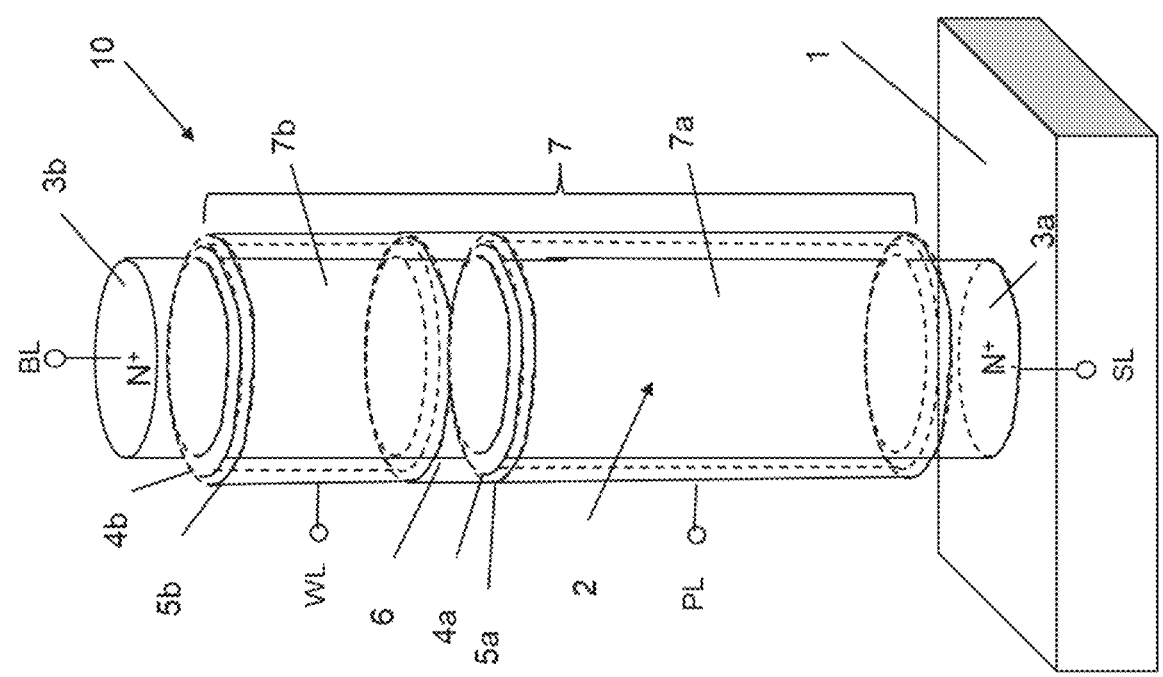
FIG. 1 is a structural diagram of a memory device having an SGT according to a first embodiment.

The structure of the dynamic flash memory cell according to the first embodiment of the present invention is shown in FIG. 1. N⁺ layers 3a and 3b (which are examples of a "first impurity region" and a "second impurity region" described in Claims), one of which serves as a source while the other serves as a drain, are formed at upper and lower positions in a silicon semiconductor pillar 2 (which is an example of a "semiconductor base material" described in Claims, and will be referred to hereinafter as a "Si pillar") formed on a substrate 1 (which is an example of a "substrate" described in Claims) and having a P or i conductivity type (intrinsic type). That part of the Si pillar 2 which is between the N⁺ layers 3a and 3b that serves as the source and the drain is a semiconductor base material 7 (which is an example of a "semiconductor base material" described in Claims). A first gate insulating layer 4a (which is an example of a "first gate insulating layer" described in Claims) and a second gate insulating layer 4b (which is an example of a "second gate insulating layer" described in Claims) are formed by surrounding the semiconductor base material 7. The first gate insulating layer 4a and the second gate insulating layer 4b are placed, respectively, in contact with, or close to, the N⁺ layers 3a and 3b that serve as the source and the drain. The first gate conductor layer 5a (which is an example of a "first gate conductor layer" described in Claims) and the second gate conductor layer 5b (which is an example of a "second gate conductor layer" described in Claims) are formed by surrounding the first gate insulating layer 4a and the second gate insulating layer 4b, respectively. The first gate conductor layer 5a and the second gate conductor layer 5b are separated by an insulating layer 6 (which is an example of a "first insulating layer" described in Claims). The semiconductor base material 7 which is between the N-layers 3a and 3b, is made up of a first channel Si layer 7a surrounded by the first gate insulating layer 4a (which is an example of a "first semiconductor base material" described in Claims) and a second channel Si layer 7b (which is an example of a "second semiconductor base material" described in Claims) surrounded by the second gate insulating layer 4b. This results in formation of a dynamic flash memory cell 10 made up of the N⁺ layers 3a and 3b, which are to become the source and the drain, the semiconductor base material 7, the first gate insulating layer 4a, the second gate insulating layer 4b, the first gate conductor layer 5a, and the second gate conductor layer 5b. Then, the N⁺ layer 3a to become the source is connected to the source line SL (which is an example of a "source line" described in Claims), the N⁺ layer 3b to become the drain is connected to the bit line BL (which is an example of a "bit line" described in Claims), the first gate conductor layer 5a is connected to the plate line PL, which is a drive control line (which is an example of a "drive control line" described in Claims), and the second gate conductor layer 5b is connected to the word line WL (which is an example of a "word line" described in Claims). Desirably the gate capacitance of the first gate conductor layer 5a connected with the plate line PL is structured to be higher than the gate capacitance of the second gate conductor layer 5b connected with the word line WL.

Note that in FIG. 1, the first gate conductor layer 5a is made larger in gate length than the second gate conductor layer 5b such that the first gate conductor layer 5a connected to the plate line PL will be higher in gate capacitance than the second gate conductor layer 5b connected with the word line WL. In addition, however, instead of making the first gate conductor layer 5a larger in gate length than the second gate conductor layer 5b, film thicknesses of the gate insulating layers may be changed such that a gate insulating film of the first gate insulating layer 4a will be smaller in film thickness than a gate insulating film of the second gate insulating layer 4b. Also, materials of the gate insulating layers may be varied in permittivity such that the gate insulating film of the first gate insulating layer 4a will be higher in permittivity than the gate insulating film of the second gate insulating layer 4b. Besides, the first gate conductor layer 5a connected to the plate line PL may be made higher in gate capacitance than the second gate conductor layer 5b connected with the word line WL by combining any of the following: lengths of the gate conductor layers, 5a and 5b, and film thicknesses and permittivities of the gate insulating layers 4a and 4b.

FIGS. 2A to 2C are diagrams explaining effects produced when the gate capacitance of the first gate conductor layer 5a connected to the plate line PL is made higher than the gate capacitance of the second gate conductor layer 5b connected with the word line WL.

FIG. 2A shows only main part of the dynamic flash memory cell according to the first embodiment of the present invention in a simplified manner. The dynamic flash memory cell is connected with the bit line BL, the word line WL, the plate line PL, and the source line SL, whose voltage states determine a potential state of the semiconductor base material 7.

FIG. 2B is a diagram for explaining relationships among capacitances. Capacitance $C_{FB}$ of the semiconductor base material 7 is the sum total of capacitance $C_{WL}$ between the gate 5b connected with the word line WL and the semiconductor base material 7, capacitance $C_{PL}$ between the gate 5a connected with the plate line PL and the semiconductor base material 1, junction capacitance $C_{SL}$ of a pn junction between the source N⁺ layer 3a connected with the source line SL and the semiconductor base material 7, and junction capacitance $C_{BL}$ of a pn junction between the drain N⁺ layer 3b connected with the bit line BL and the semiconductor base material 7, and is given by $$C_{FB}=C_{WL}+C_{PL}+C_{BL}+C_{SL} \quad (1)$$

Therefore, a coupling ratio $\beta_{WL}$ between the word line WL and the semiconductor base material 7, a coupling ratio $\beta_{PL}$ between the plate line PL and the semiconductor base material 7, a coupling ratio $\beta_{BL}$ between the bit line BL and the semiconductor base material 7, and a coupling ratio $\beta_{SL}$ between the source line SL and the semiconductor base material 7 are given, respectively, by $$\beta_{WL}=C_{WL}/(C_{WL}+C_{PL}+C_{BL}+C_{SL}) \quad (2)$$

$$\beta_{PL}=C_{PL}/(C_{WL}+C_{PL}+C_{BL}+C_{SL}) \quad (3)$$

$$\beta_{BL}=C_{BL}/(C_{WL}+C_{PL}+C_{BL}+C_{SL}) \quad (2)$$

$$\beta_{SL}=C_{SL}/(C_{WL}+C_{PL}+C_{BL}+C_{SL}) \quad (2)$$

where $C_{PL}>C_{WL}$, and thus $\beta_{PL}>\beta_{WL}$.

FIG. 2C is a diagram for explaining changes of a voltage $V_{FB}$ in the semiconductor base material 7 when a voltage $V_{WL}$ of the word line WL rises during read and write operations and falls subsequently. Here, when the voltage Vic, of the word line WL rises from 0 V to a high-voltage state $V_{WLH}$ and the voltage $V_{FB}$ of the semiconductor base material 7 changes from a low-voltage state $V_{FBL}$ to a high-voltage state $V_{FBH}$, a potential difference $\Delta V_{FB}$ is given by $$\Delta V_{FB} = V_{FBH} - V_{FBL} = \beta_{WL} \times V_{WLH} \tag{6}$$

Because the coupling ratio $\beta_{WL}$ between the word line WL and the semiconductor base material 7 is low and the coupling ratio $\beta_{PL}$ between the plate line PL and the semiconductor base material 7 is high, $\Delta V_{FB}$ is low and even if the voltage $V_{WL}$ of the word line WL rises and falls during read and write operations, the voltage $V_{FB}$ of the semiconductor base material 7 almost does not change.

A write operation of the dynamic flash memory cell according to the first embodiment of the present invention is shown in FIGS. 3A to 3D. FIG. 3A shows a mechanism of the write operation and FIG. 3B shows operation waveforms of the bit line BL, source line SL, plate line PL, word line WL, and semiconductor base material 7, which is indicated as the floating body FB. At time T0, the dynamic flash memory cell is in a "0" erased state and the voltage of the semiconductor base material 7 is $V_{FB}$ "0." Besides, Vss is applied to the bit line BL, the source line SL, and the word line WL while $V_{PLL}$ is applied to the plate line PL. Here, for example, Vss is 0 V and $V_{PLL}$ is 2 V. Next, from time T1 to time T2, when the bit line BL rises from Vss to $V_{BLH}$, for example, if Vss is 0 V, the voltage of the semiconductor base material 7 becomes $V_{FB}$ "0"+$\beta_{BL} \times V_{BLH}$ as a result of capacitive coupling between the bit line BL and the semiconductor base material 7.

Next, a write operation of the dynamic flash memory cell will be described using FIGS. 3A and 3B. From time T3 to time T4, the word line WL rises from Vss to $V_{WLH}$. Consequently, when the second gate conductor layer 5b connected with the word line WL sets a "0" erasing threshold voltage of a second n-channel MOS transistor region surrounding the semiconductor base material 7 to $Vt_{WL}$ "0," as the word line WL rises, from Vss to $Vt_{WL}$ "0," the voltage of the semiconductor base material 7 becomes $V_{FB}$ "0"+ $\beta_{BL} \times V_{BLH} + \beta_{WL} \times Vt_{WL}$ "0" as a result of second capacitive coupling between the word line WL and the semiconductor base material 7. If the word line WL rises to or above $Vt_{WL}$ "0," an annular inversion layer 12b is formed in the semiconductor base material 7 inside the second gate conductor layer 5b, blocking the second capacitive coupling between the word line WL and the semiconductor base material 7.

Description of the write operation of the dynamic flash memory cell will be continued using FIGS. 3A and 3B. From time T3 to time T4, for example, $V_{PLL}=2$ V is inputted constantly to the first gate conductor layer 5a connected with the plate line PL, raising the second gate conductor layer 5b connected with the word line WL to, for example, $V_{WLH}=4$ V. Consequently, as shown in FIG. 3A, an annular inversion layer 12a is formed on the semiconductor base material 7 inside the first gate conductor layer 5a connected with the plate line PL, with a pinch-off point 13 existing in the inversion layer 12a. As a result, a first n-channel MOS transistor region having the first gate conductor layer 5a operates in a saturation region. On the other hand, the second n-channel MOS transistor region having the second gate conductor layer 12b that is connected with the word line WL operates in a linear region. As a result, no pinch-off point exists in the semiconductor base material 7 inside the second gate conductor layer 5b connected with the word line WL, and an inversion layer 12b is formed on the entire surface. The inversion layer 12b formed on the entire inner circumference of the second gate conductor layer 5b connected with the word line WL operates as a practical drain of the second n-channel MOS transistor region having the second gate conductor layer 5b. As a result, an electric field is maximized and an impact ionization phenomenon occurs in a first boundary region of the semiconductor base material 7 between the first n-channel MOS transistor region having the first gate conductor layer 5a that is connected in series and the second n-channel MOS transistor region having the second gate conductor layer 5b. The first boundary region is a source-side region as viewed from the second n-channel MOS transistor region having the second gate conductor layer 5b that is connected with the word line WL, and thus the phenomenon is called a source-side impact ionization phenomenon. As a result of the source-side impact ionization phenomenon, electrons flow from the $N^+$ layer 3a connected with the source line SL toward the $N^+$ layer 3b connected with the bit line. Accelerated electrons collide with Si lattice atoms and electron-hole pairs are created by kinetic energy of the accelerated electrons. Part of the generated electrons flows to the first gate conductor layer 5a and the second gate conductor layer 5b, but most of the electrons flow to the $N^+$ layer 3b connected to the bit line BL (not shown).

As shown in FIG. 3C, generated positive hole groups 9 (which are examples of a "positive hole group" described in Claims) are majority carriers in the semiconductor base material 7 and charge the semiconductor base material 7 so as to be positively biased. The $N^+$ layer 3a connected with the source line SL is 0 V and thus the semiconductor base material 7 is charged to a built-in voltage Vb (approximately 0.7 V) of a pn junction between the $N^+$ layer 3a connected with the source line SL and the semiconductor base material 7. Once the semiconductor base material 7 is charged to be positively biased, threshold voltages of the first n-channel MOS transistor region and second n-channel MOS transistor region fall due to a substrate bias effect.

Description of the write operation of the dynamic flash memory cell will be continued using FIG. 3B. From time T6 to time T7, the voltage of the word line WL drops from $V_{WLH}$ to Vss. In so doing, the word line WL and the semiconductor base material 7 form second capacitive coupling, but until the voltage $V_{WLH}$ of the word line WL becomes equal to or lower than the threshold voltage $Vt_{WL}$ "1" of the second n-channel MOS transistor region when the voltage of the semiconductor base material 7 is Vb, the inversion layer 12b blocks the second capacitive coupling. Therefore, practical capacitive coupling between the word line WL and the semiconductor base material 7 is enabled only when the word line WL becomes equal to or lower than $Vt_{WL}$ "1" and falls to Vss. As a result, the voltage of the semiconductor base material 7 becomes Vb−$\beta_{WL} \times Vt_{WL}$ "1." Here, $Vt_{WL}$ "1" is lower than $Vt_{WL}$ "0" described above, and thus $\beta_{WL} \times Vt_{WL}$ "1" is low.

Description of the write operation of the dynamic flash memory cell will be continued using FIG. 3B. From time T8 to time T9, the bit line BL drops from $V_{BLH}$ to Vss. Since the bit line BL and the semiconductor base material 7 are capacitively coupled, eventually "1"-writing voltage $V_{FB}$ "1" of the semiconductor base material 7 becomes as follows.

$$V_{FB}\text{"1"} = Vb - \beta_{WL} \times Vt_{WL}\text{"1"} - \beta_{BL} \times V_{BLH} \tag{7}$$

where the coupling ratio $\beta_{BL}$ between the bit line BL and the semiconductor base material 7 is also low. Consequently, as shown in FIG. 3D, the threshold voltage of the second n-channel MOS transistor region of a second semiconductor base material 7b connected with the word line WL becomes low. A "1" written state of the semiconductor base material 7 is set to a first data retention voltage (which is an example of a "first data retention voltage" described in Claims). A memory write operation (which is an example of a "memory write operation" described in Claims) is performed and this state is assigned to logical storage data "1."

Note that in the write operation, electron-hole pairs may be generated by an impact ionization phenomenon in a second boundary region between a first impurity region 3a and a first semiconductor base material 7a or in a third boundary region between a second impurity region 3b and a second semiconductor base material 7b rather than in the first boundary region, and the semiconductor base material 7 may be charged with the generated positive hole groups 9.

A memory erase operation (which is an example of a "memory erase operation" described in Claims) mechanism is described in FIGS. 4AA to 4AC and 4B. The semiconductor base material 7 between the N⁺ layers 3a and 3b is electrically separated from the substrate, making up a floating body. FIG. 4AA shows that before the erase operation, the positive hole groups 9 generated by impact ionization in the previous cycle are stored in the semiconductor base material 7. As shown in FIG. 4AB, during an erase operation, the voltage of the source line SL is set to a negative voltage $V_{ERA}$. Here, $V_{ERA}$ is, for example, −3 V. Consequently, regardless of the value of an initial potential of the semiconductor base material 7, the pn junction between the N⁺ layer 3a connected with the source line SL to serve as a source and the semiconductor base material 7 becomes forward-biased. As a result, the positive hole groups 9 generated by impact ionization in the previous cycle and stored in the semiconductor base material 7 are drawn into the N⁺ layer 3a in a source area, a potential $V_{FB}$ of the semiconductor base material 7 becomes $V_{FB}=V_{ERA}+Vb$, and the resulting voltage value becomes a second data retention voltage (which is an example of a "second data retention voltage" described in Claims). Here, Vb is the built-in voltage of the pn junction and is approximately 0.7 V. Therefore, when $V_{ER}$=−3 V, the potential of the semiconductor base material 7 becomes −2.3 V. This value is the potential state of the semiconductor base material 7 in an erased state. Therefore, when a potential of the semiconductor base material 7 of the floating body becomes a negative voltage, the threshold voltage of the second n-channel MOS transistor region increases due to the substrate bias effect. Consequently, as shown in FIG. 4AC, a threshold voltage of the second gate conductor layer 5b connected with the word line WL increases. The erased state of the semiconductor base material 7 turns to "0" of logical storage data. Note that an example of voltage conditions for major node contacts during the erase operation is shown in FIG. 4B.

FIGS. 5A to 5C are diagrams for explaining a read operation of the dynamic flash memory cell according to the first embodiment of the present invention. As shown in FIG. 5A, when the semiconductor base material 7 is charged to the built-in voltage Vb (approximately 0.7 V), the threshold voltage of the second n-channel MOS transistor region having the second gate conductor layer 5b that is connected with the word line WL drops due to the substrate bias effect. This state is assigned to logical storage data "1." As shown in FIG. 5B, a memory block selected before a write is set to an erased state "0" in advance and the voltage $V_{FB}$ of the semiconductor base material 7 is $V_{FB}$ "0." As a result of write operations, a written state "1" is stored randomly. As a result, logical storage data of logic "0" and logic "1" is created for the word line WL. As shown in FIG. 5C, using a height difference between two threshold voltages for the word line WL, reading is done by a sense amplifier. During the data read, if the voltage to be applied to the first gate conductor layer 5a joined to the plate line PL is set higher than the threshold voltage at a time when the logical storage data is "1" and lower than the threshold voltage at a time when the logical storage data is "0," the property that no current flows even if the voltage of the word line WL is increased is obtained.

Figure 6:
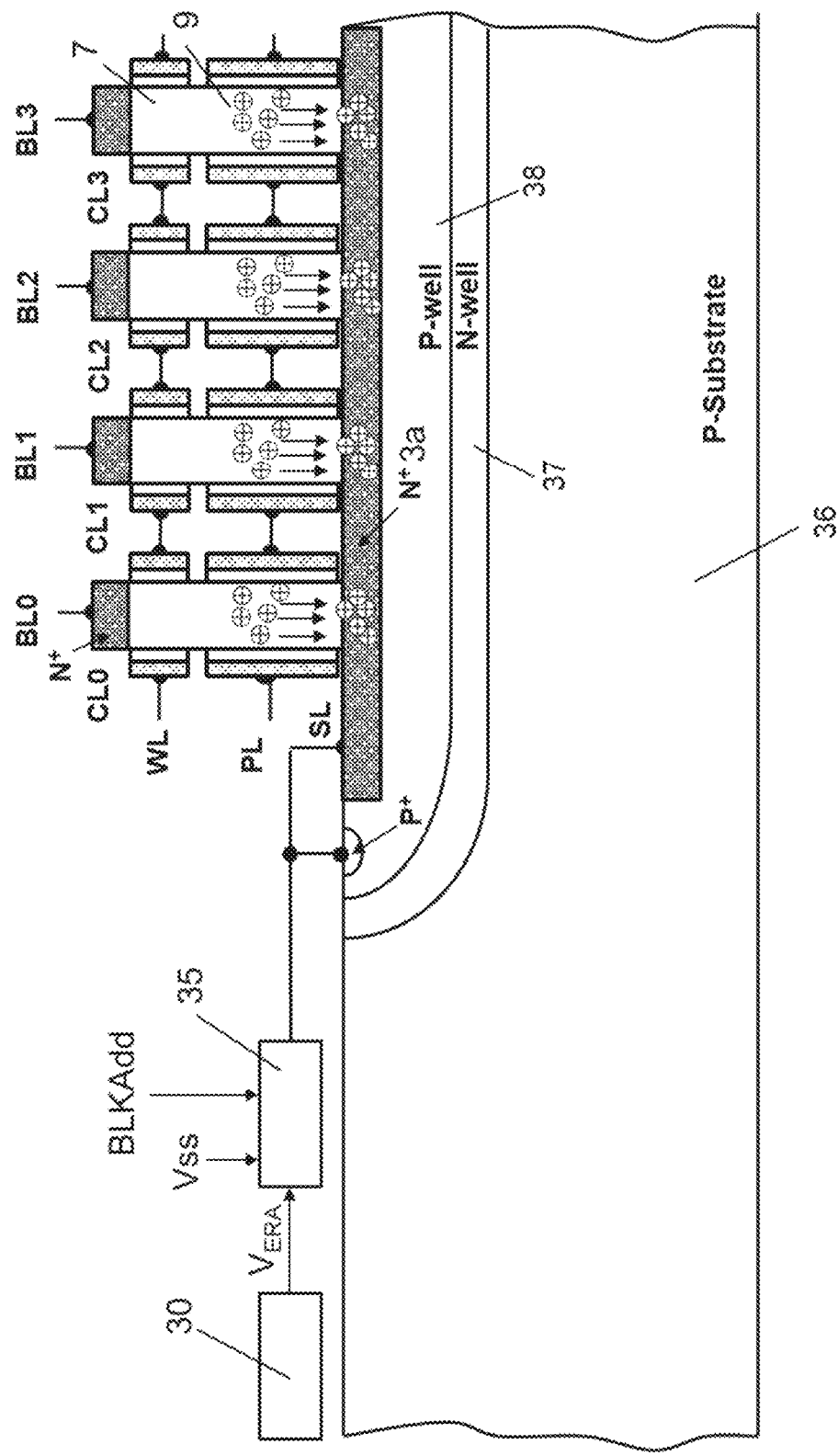
FIG. 6 is a sectional structure diagram of a dynamic flash memory cell area according to the first embodiment of the present invention.

FIG. 6 shows a sectional structure diagram of a dynamic flash memory cell area to explain a block erase operation according to the first embodiment of the present invention. In a block (which is an example of a "block" described in Claims), multiple memory cells are arrayed in a matrix. When any block is selected in a block erase operation, all the memory cells in the selected block can be erased. In FIG. 6, to enable the block erase operation, dynamic flash memory cells CL0 to CL3 are formed on a two-tiered well made up of an n-type semiconductor layer 37, which is a first impurity well layer provided on a p-type semiconductor substrate 36, and a p-type semiconductor layer 38, which is a second impurity well layer, (where the first impurity well layer is an example of a "first impurity well layer" described in Claims, the p-type semiconductor substrate 36 is an example of a "p-type semiconductor substrate" described in Claims, the n-type semiconductor layer 37 is an example of an "n-type semiconductor layer" described in Claims, the second impurity well layer is an example of a "second impurity well layer" described in Claims, and the p-type semiconductor layer 38 is an example of a "p-type semiconductor layer" described in Claims). Then, the dynamic flash memory cells CL0 to CL3 of the block are formed on a two-tiered well, making up the block. The dynamic flash memory cells CL0 to CL3 are connected, respectively, with bit lines BL0 to BL3 and connected commonly with the word line WL as well as with the plate line PL. Besides, the source line SL is connected commonly to blocks.

Description of the block erase operation (which is an example of a "block erase operation" described in Claims) of the dynamic flash memory cell according to the first embodiment of the present invention will be continued using FIG. 6. The block erase operation is started and an arbitrary block is selected. An erase voltage (which is an example of an "erase voltage" described in Claims) $V_{ERA}$, which is a negative voltage (which is an example of a "negative voltage" described in Claims) is generated by an erase voltage generator circuit (which is an example of an "erase voltage generator circuit" described in Claims) 30. The erase voltage $V_{ERA}$ is, for example, −3 V and is inputted to a level conversion circuit (which is an example of a "level conversion circuit" described in Claims) 35. An output BLKAdd and a ground voltage Vss from a block address decoder circuit 34 (see, FIGS. 9A to 9D) are also inputted to the level conversion circuit 35. Consequently, the erase voltage $V_{ERA}$ is applied to the source line SL and the p-type semiconductor layer (P-well) 38 formed on the N⁺ layer 3 of a block for which an erase operation is performed selectively. On the other hand, the ground voltage (which is an example of a "ground voltage" described in Claims) Vss is applied to the source line SL and the p-type semiconductor layer (P-well) 38 formed on the N⁺ layer of other blocks, i.e., non-elected blocks for which an erase operation is not performed (not shown).

Description of the block erase operation of the dynamic flash memory cell according to the first embodiment of the present invention will be continued using FIG. 6. In this way, in the dynamic flash memory cells CL0 to CL3 of the selected block, the source line SL provides an erase bias $V_{ERA}$ and consequently, positive hole groups 11 generated by impact ionization phenomenon in the previous cycle and stored in the semiconductor base material 7 are drawn into the N⁺ layer 3a in a source area, and the voltage $V_{FB}$ of the semiconductor base material 1 becomes $V_{FB}=V_{ERA}+Vb$. Here, Vb is the built-in voltage of the pn junction and is approximately 0.7 V. Therefore, when $V_E; =-3$ V, the voltage of the semiconductor base material 7 becomes -2.3 V. This value is the voltage state of the semiconductor base material 7 in an erased state. Therefore, when a potential of the semiconductor base material 7 of the floating body becomes a negative voltage, the threshold voltage of the n-channel MOS transistor regions of the dynamic flash memory cells CL0 to CL3 increases due to the substrate bias effect. Consequently, as shown in FIG. 4AC, a threshold voltage of the second gate conductor layer 5b connected with the word line WL increases. The erased state of the semiconductor base material 7 turns to "0" of logical storage data.

As shown in FIG. 6, in the dynamic flash memory cells CL0 to CL3 of the block selected at the time of block erasure, while the erase voltage $V_{ERA}$ is being applied to the source line SL, no specific dc voltage is applied to the bit lines BL0 to BL3. The bit lines BL0 to BL3 may be put in a floating state (which is an example of a "floating state" described in Claims). If the bit lines BL0 to BL3 are kept in a floating state, no current flows from the bit lines BL to the source line SL. Since the erase voltage $V_{ERA}$ is being applied to the source line SL, keeping the potential of the semiconductor base material 7 $V_{FB}$ at $V_{FB}=V_{ERA}+Vb$, the pn junction between the semiconductor base material 7 of the p-layer and the N⁺ layer of the bit lines BL becomes reverse-biased.

The two-tiered well structure, such as shown in FIG. 6, made up of the n-type semiconductor layer (N-well) 37 and p-type semiconductor layer (P-well) 38 provided on the p-type semiconductor substrate 36 is separated on a block by block basis to perform erasure on a per block basis. Consequently, the erase voltage $V_{ERA}$ is applied to the source line SL formed of an N⁺ layer and to the p-type semiconductor layer (P-well) 38, in only the block selected for the block erase operation.

Note that in FIG. 1, desirably vertical length of the first gate conductor layer 5a connected with the plate line PL is made still larger than vertical length of the second gate conductor layer 5b connected with the word line WL such that $C_{PL}>C_{WL}$. However, by merely adding the plate line PL, a capacitive coupling ratio $(C_{WL}/(C_{PL}+C_{WL}+C_{BL}+C_{SL}))$ of the word line WL to the semiconductor base material 7 is reduced. This reduces a potential fluctuation $\Delta V_{FB}$ in the semiconductor base material 7 of the floating body.

Besides, as the voltage $V_{PLL}$ of the plate line PL, a fixed voltage of, for example, 2 V may be applied.

In FIG. 1, operation of the dynamic flash memory described in the present embodiment can be performed even if a horizontal sectional shape of the Si pillar 2 is circular, elliptical, or rectangular. Besides, circular, elliptical, and rectangular dynamic flash memory cells may be allowed to coexist on a same chip.

In FIG. 1, a dynamic flash memory element has been described by taking as an example an SGT that includes the first gate insulating layer 4a surrounding an entire lateral surface of the Si pillar 2 erected in a vertical direction on the substrate 1, the second gate insulating layer 4b, and the first gate conductor layer 5a and second gate conductor layer 5b surrounding the entire first gate insulating layer 4a and second gate insulating layer 4b. As indicated in the description of the present embodiment, it is sufficient if the present dynamic flash memory element is structured to satisfy the condition that the positive hole groups 9 generated by the impact ionization phenomenon are held in the semiconductor base material 7. For that, it is sufficient that the semiconductor base material 7 has a floating body structure separated from the substrate 1. Consequently, the above-mentioned operation of the dynamic flash memory can be performed using, for example, GAA (Gate All Around; see, for example, E. Yoshida: "A Capacitorless 1T-DRAM Technology Using Gate-Induced Drain-Leakage (GIDL) Current for Low-Power and High-Speed Embedded Memory," IEEE IEDM (2006)) technology, which is one of SGTs, or Nanosheet technology (see, for example, J. Y. Song, W. Y. Choi, J. H. Park, J. D. Lee, and B-G. Park: "Design Optimization of Gate-All-Around(GAA)MOSFETs," IEEE Trans. Electron Devices, vol. 5, no. 3, pp. 186-191, May 2006), even if the semiconductor base material is formed horizontally to the substrate 1. A device structure (see, for example, J. Wan, L. Rojer, A. Zaslavsky, and S. Critoloveanu: "A Compact Capacitor-Less High-Speed DRAM Using Field Effect-Controlled Charge Regeneration," Electron Device Letters, Vol. 35, No. 2, pp. 179-181 (2012); T. Ohsawa, K. Fujita, T. Higashi, Y. Iwata, T. Kajiyama, Y. Asao, and K. Sunouchi: "Memory design using a one-transistor gain cell on SOI," IEEE JSSC, vol. 37, No. 11, pp 1510-1522 (2002); T. Shino, N. Kusunoki, T. Higashi, T. Ohsawa, K. Fujita, K. Hatsuda, N. Ikumi, F. Matsuoka, Y. Kajitani, R. Fukuda, Y. Watanabe, Y. Minami, A. Sakamoto, J. Nishimura, H. Nakajima, M. Morikado, K. Inoh, T. Hamamoto, A. Nitayama: "Floating Body RAM Technology and its Scalability to 32 nm Node and Beyond," IEEE IEDM (2006); E. Yoshida: "A Capacitorless 1T-DRAM Technology Using Gate-Induced Drain-Leakage (GIDL) Current for Low-Power and High-Speed Embedded Memory," IEEE IEDM (2006)) that uses SOI (Silicon On Insulator) may also be used. In this device structure, a bottom of a semiconductor base material is in contact with an insulating layer of an SOI substrate and surrounds other semiconductor base materials while being surrounded by a gate insulating layer and an element separating insulating layer. In this structure, again the semiconductor base material has a floating body structure. In this way, it is sufficient if the dynamic flash memory element provided by the present embodiment satisfies the condition that the semiconductor base material has a floating body structure. Even with a structure in which a Fin transistor (see, for example, H. Jiang, N. Xu, B. Chen, L. Zeng1, Y. He, G. Du, X. Liu and X. Zhang: "Experimental investigation of self-heating effect (SHE) in multiple-fin SOI FinFETs," Semicond. Sci. Technol. 29 (2014) 115021 (7pp)) is formed on an SOI substrate, the present dynamic flash operation can be performed as long as the semiconductor base material has a floating body structure.

In "1" writing, electron-hole pairs may be generated using a GIDL (Gate Induced Drain Leakage) current (see, for example, E. Yoshida, and T. Tanaka: "A Capacitorless 1T-DRAM Technology Using Gate-Induced Drain-Leakage (GIDL) Current for Low-Power and High-Speed Embedded Memory," IEEE Transactions on Electron Devices, Vol. 53, No. 4, pp. 692-69, April 2006) and the semiconductor base material 7 may be filled with the generated positive hole groups.

Equations (1) to (10) in the present specification and drawings are used to quantitatively describe phenomena, and are not intended to limit the phenomena.

An example of conditions for the erase operation has been shown in FIG. 4B. In contrast, if a situation in which the positive hole groups 9 in the semiconductor base material 7 are removed from both or one of the N⁺ layer 3a and N⁺ layer 3b can be realized, the voltages applied to the source line SL, the plate line PL, the bit line BL, and the word line WL may be changed. Besides, in the block erase operation, by applying an erase voltage to the source line SL of the selected block, the bit line BL may be put in a floating state.

Besides, in a vertical direction in FIG. 1, in that part of the semiconductor base material 7 which is surrounded by the insulating layer 6, which is the first insulating layer, potential distributions of a first semiconductor base material 7a and second semiconductor base material 7b are formed by being joined together. Consequently, the first semiconductor base material 7a and second semiconductor base material 7b of the semiconductor base material 7 are joined together in the vertical direction via a region surrounded by the insulating layer 6, which is the first insulating layer.

Besides, in FIG. 1, the first gate conductor layer 5a may be divided, in planar view or in a vertical direction, into two or more parts, which may be operated synchronously or asynchronously, each as a conductor electrode of a plate line, by a same drive voltage or different drive voltages. Similarly, the second gate conductor layer 5b may be divided, in planar view or in a vertical direction, into two or more parts, which may be operated synchronously or asynchronously, each as a conductor electrode of a word line, by a same drive voltage or different drive voltages. This also enables the dynamic flash memory operation. When the first gate conductor layer 5a is divided into two or more parts, at least one of the resulting first gate conductor layers serves the role of the first gate conductor layer 5a. Also, when the second gate conductor layer 5b is divided, at least one of the resulting second gate conductor layers serves the role of the second gate conductor layer 5b. In the vertical direction, one of the first gate conductor layer 5a and the second gate conductor layer 5b may be placed on opposite sides of the other gate conductor layer, i.e., the first gate conductor layer 5a or the second gate conductor layer 5b.

The conditions of the voltages applied to the bit lines BL, the source lines SL, the word lines WL, and the plate lines PL as well as the voltage of the floating body are exemplary in performing basic operations including erase operations, write operations, and read operations, and other voltage conditions that allow the basic operations of the present invention to be performed may be used.

Besides, in FIG. 1, the first gate conductor layer 5a may be connected to the word line WL and the second gate conductor layer 5b may be connected to the plate line PL. This also enables the present dynamic flash memory operation described above.

Alternatively, a junctionless structure, in which the N⁺ layers 3a and 3b of the dynamic flash memory cell shown in FIG. 1 and the p-layer 7 of the semiconductor base material are made equal in electrical conductivity, may be used. This similarly applies to other embodiments.

The present embodiment has the following features.
(Feature 1)
In the dynamic flash memory cell according to the present embodiment, the N⁺ layers 3a and 3b, which are to become the source and the drain, the semiconductor base material 7, the first gate insulating layer 4a, the second gate insulating layer 4b, the first gate conductor layer 5a, and the second gate conductor layer 5b are formed into the shape of a pillar as a whole. Then, the N⁺ layer 3a to become the source is connected to the source line SL, the N⁺ layer 3b to become the drain is connected to the bit line BL, the first gate conductor layer 5a is connected to the plate line PL, and the second gate conductor layer 5b is connected to the word line WL. The gate capacitance of the first gate conductor layer 5a connected with the plate line PL is structured to be higher than the gate capacitance of the second gate conductor layer 5b connected with the word line WL. In the present dynamic flash memory cell, the first gate conductor layer and the second gate conductor layer are stacked in the vertical direction. Consequently, even if the gate capacitance of the first gate conductor layer 5a connected with the plate line PL is structured to be higher than the gate capacitance of the second gate conductor layer 5b connected with the word line WL, the area of the memory cell is not increased in planar view. This makes it possible to achieve higher performance and greater packaging density of the dynamic flash memory cell at the same time. During the data read, if the voltage to be applied to the first gate conductor layer 5a joined to the plate line PL is set higher than the threshold voltage at a time when the logical storage data is "1" and lower than the threshold voltage at a time when the logical storage data is "0," the property that no current flows even if the voltage of the word line WL is increased is obtained. This leads to a further increase in an operating margin of the dynamic flash memory cell.
(Feature 2)
The dynamic flash memory cell according to the first embodiment of the present invention is formed in a p-type semiconductor well layer formed in an n-type semiconductor well layer, which in turn is formed on a p-type semiconductor layer substrate. Multiple dynamic flash memory cells are arrayed in a matrix in a double-well structure made up of the n-type semiconductor well layer and the p-type semiconductor well layer and makes up a block. This makes it possible to control the source line SL independently on a block by block basis, enabling block erase operations. Furthermore, an erase voltage can be applied to the source line SL for blocks to be erased and a ground voltage can be applied to blocks not to be erased.
(Feature 3)
The dynamic flash memory cell according to the first embodiment of the present invention applies a negative voltage to the source line SL in a selected block at the time of block erasure, but the bit line can be left in a floating state without application of a specific dc voltage. Consequently, no current flows from the bit line BL to the source line SL. Besides, since the erase voltage $V_{ERA}$ is applied to the source line SL and the potential $V_{FB}$ of the semiconductor base material 7 is $V_{FB}=V_{FRA}+Vb$, the pn junction between the semiconductor base material 7 of the p-layer and the N⁺ layer of the bit line BL becomes reverse-biased. This eliminates the need to apply, for example, a negative erase voltage $-V_{ERA}$ to the bit line BL. This blocks negative voltage between the circuit, such as a sense amplifier circuit, connected to the bit line BL and the bit line BL, thereby eliminates the need for a buffer circuit adapted to protect the sense amplifier circuit, and thereby makes circuit design very easy. Also, the absence of a buffer circuit makes it possible to reduce chip area accordingly, and provide the dynamic flash memory cell at low prices. Furthermore, the absence of a buffer circuit enables high-speed sensing operation of the sense amplifier circuit.
(Feature 4)
Taking a look at the role of the first gate conductor layer 5a connected with the plate line PL of the dynamic flash memory cell according to the first embodiment of the present invention, when the dynamic flash memory cell performs write and read operations, the voltage of the word line WL swings up and down. In so doing, the plate line PL serves the role of reducing the capacitive coupling ratio between the word line WL and the semiconductor base material 7. This makes it possible to greatly reduce the effect of voltage variations of the semiconductor base material 7 when the voltage of the word line WL swings up and down. This in turn makes it possible to increase a difference in the threshold voltage of an SGT transistor of the word line WL, the difference representing logic "0" or logic "1." This leads to an increase in an operating margin of the dynamic flash memory cell.

Second Embodiment

An erase bias generator circuit of a dynamic flash memory cell according to a second embodiment will be described with reference to FIG. 7.

Figure 7:
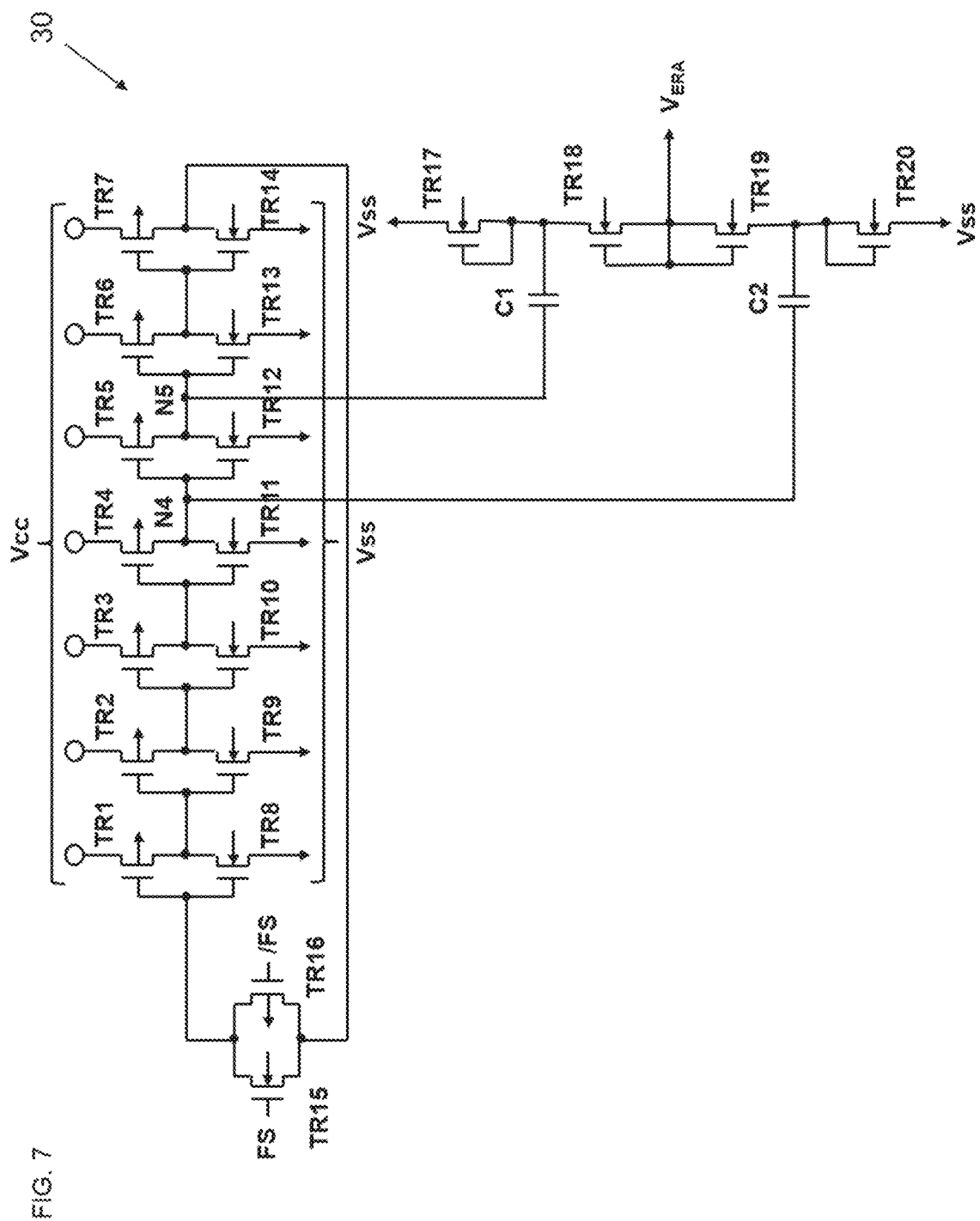
FIG. 7 is a circuit diagram of an erase bias generator circuit of a dynamic flash memory cell according to a second embodiment.
Figure 10B:
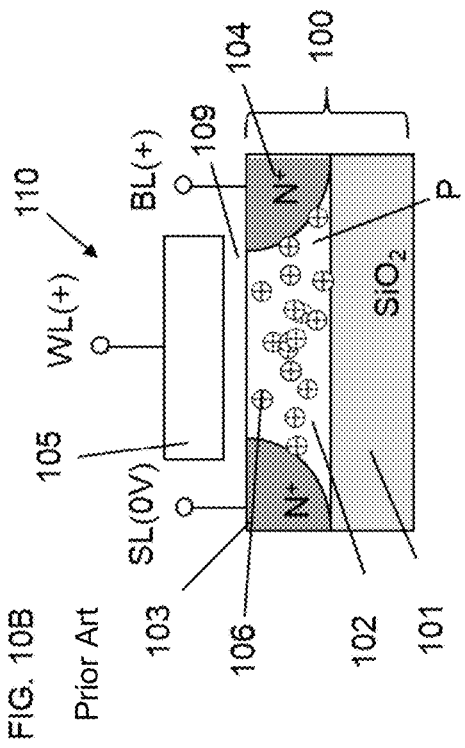
FIGS. 10A, 10B, 10C and 10D are diagrams for explaining a write operation of a capacitorless DRAM memory cell according to a conventional example.
Figure 10D:
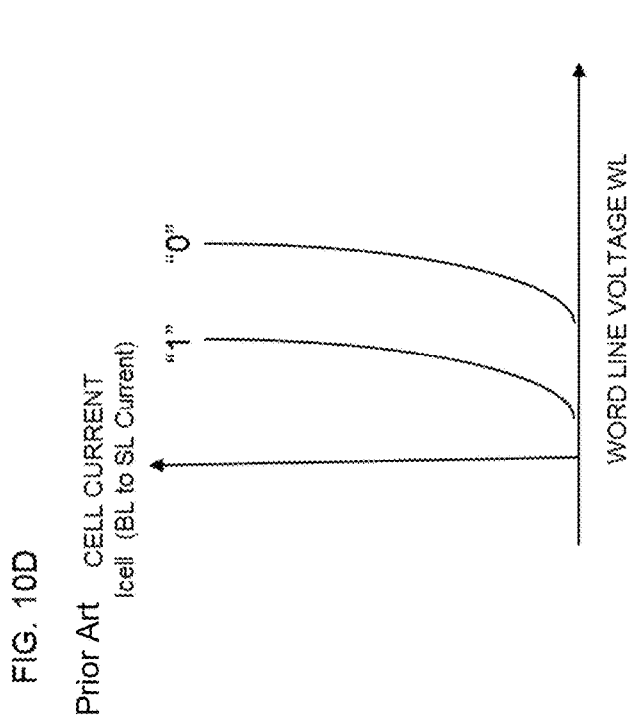
Figure 10A:
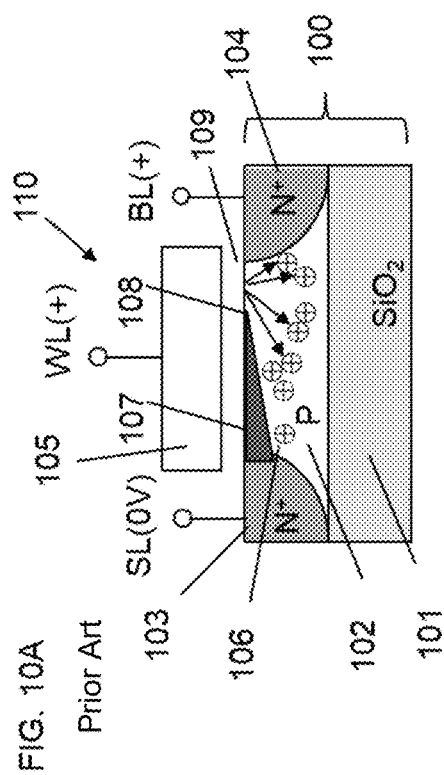
Figure 10C:
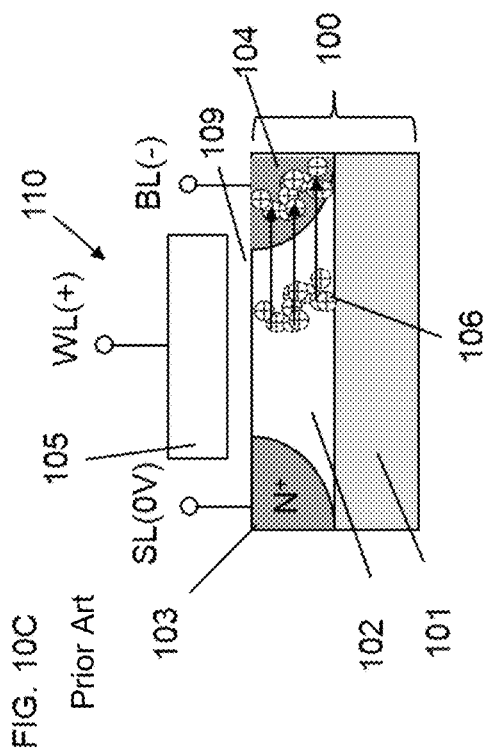
Figure 11A:
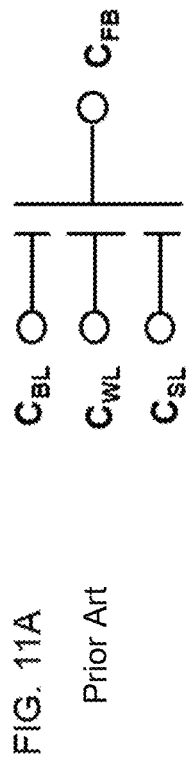
FIGS. 11A and 11B are diagrams for explaining problems in operations of the capacitorless DRAM memory cell according to the conventional example.
Figure 11B:
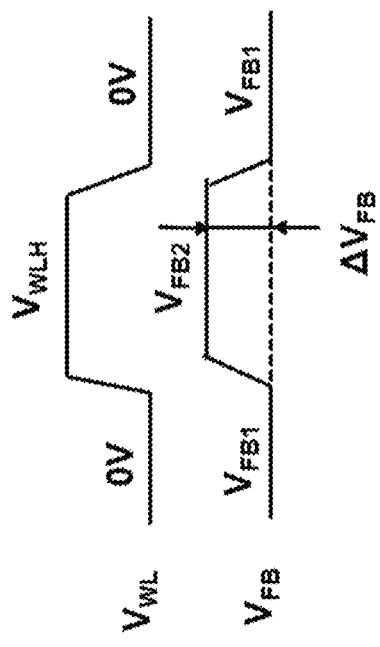
Figure 12C:
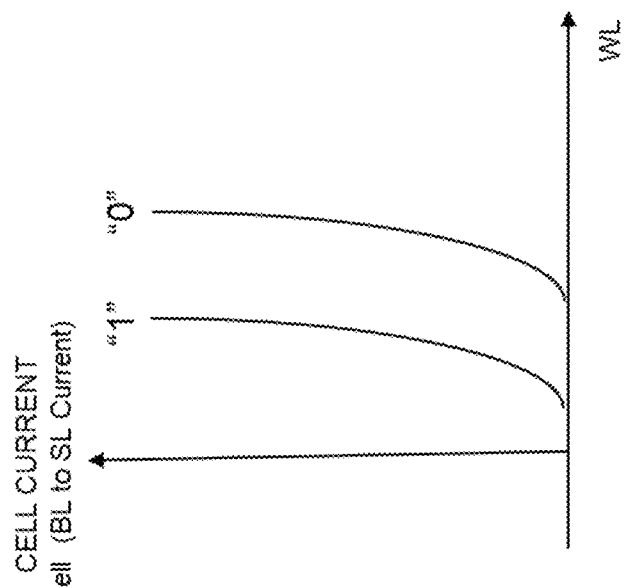
FIGS. 12A, 12B and 12C are diagrams for explaining a read operation of the capacitorless DRAM memory cell according to the conventional example.
Figure 12A:
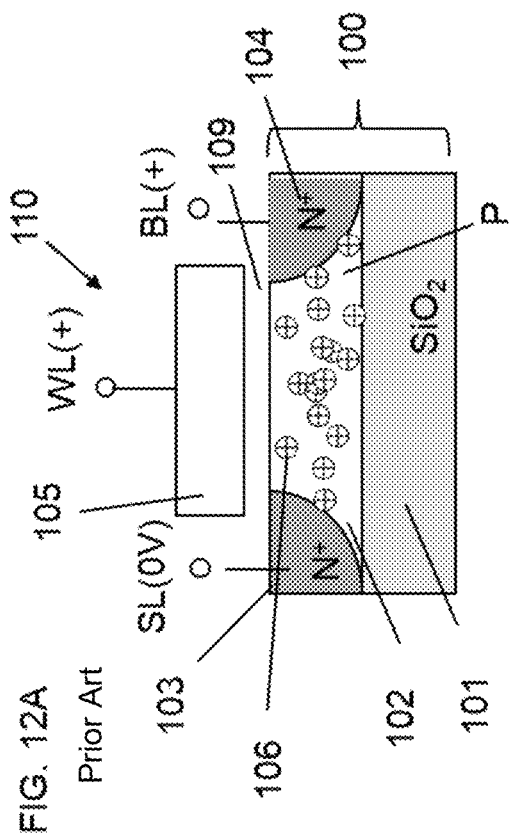
Figure 12B:
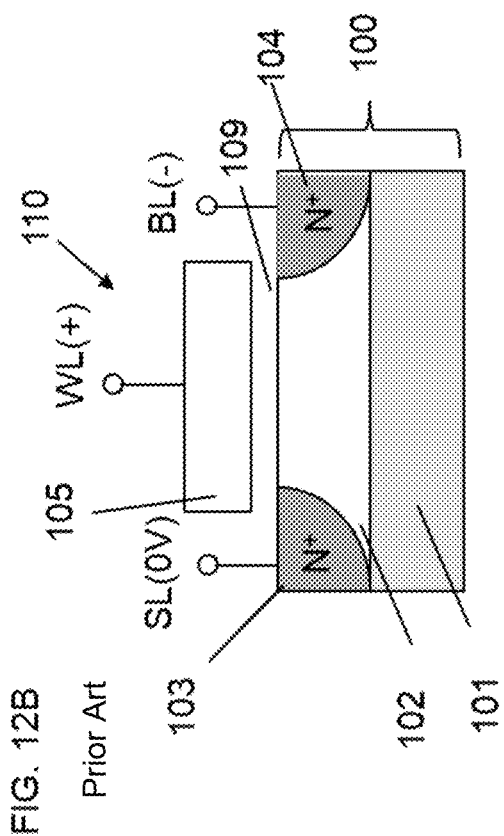

FIG. 7 shows a circuit diagram of the erase bias generator circuit 30 of the dynamic flash memory cell. In FIG. 7, transistors TR1 to TR7 and TR16 are p-channel MOS transistors while transistors TR8 to TR14, TR15, and TR17 to TR20 are n-channel MOS transistor regions. The transistors TR1 to TR14 make up a 7-stage ring oscillator. Regarding operation, the ring oscillator made up of the transistors TR1 to TR14 starts oscillation when start signals FS and/FS are inputted, respectively, to gates of the n-channel MOS transistor regions and gates of the p-channel MOS transistors. The fourth contact N4 and fifth contact N5 of the ring oscillator differ 360×4/7 degrees from each other in the phase of the oscillation waveform of the ring oscillator. By making use of the phase difference close to 180 degrees, a pump circuit made up of capacitors C1 and C2 and transistors TR17 to TR20 is operated to generate the erase voltage $V_{ERA}$.

Whereas the 7-stage ring oscillator is shown as the erase bias generator circuit 30 in FIG. 7, it is not strictly necessary that the number of stages is 7. The larger the number of stages of the ring oscillator, the closer the phase difference between the fourth contact N4 and the fifth contact N5 will be to 180 degrees. On the other hand, the frequency of the pump circuit will decrease. Therefore, it is possible to change the number of stages of the ring oscillator and design the pump circuit accordingly by taking into consideration the source line SL formed of the N$^+$ layer of a desired block and capacity of the p-well.

(Feature)

The erase bias generator circuit of the dynamic flash memory cell according to the second embodiment of the present invention makes it possible to change the number of stages of the ring oscillator and design the pump circuit accordingly by taking into consideration the source line SL formed of the N$^+$ layer 3a, shown in FIG. 6, of a desired block and capacity of the p-type semiconductor layer (P-well) 38.

Third Embodiment

A block erase operation of a dynamic flash memory cell according to a third embodiment of the present invention will be described with reference to FIGS. 8AA to 8B.

FIG. 8AA shows a circuit diagram of a memory block selected for block erasure. Here, the memory block contains 3 rows by 3 columns for a total of 9 memory cells CL11 to CL$_{33}$, but the actual memory block is larger than this matrix. Each of the memory cells are connected with source lines SL$_1$ to SL$_3$, bit lines BL$_1$ to BL$_3$, plate lines PL$_1$ to PL$_3$, and word lines WL$_1$ to WL$_3$. As shown in FIGS. 8AB to 8AD and FIG. 8B, an erase voltage V$_{ERA}$ is applied to the source lines SL$_1$ to SL$_3$ of the memory blocks selected for block erasure. At this point, the bit lines BL$_1$ to BL$_3$ are at V$_{SS}$ and the word lines WL$_1$ to WL$_3$ are at V$_{SS}$. For example, V$_{SS}$ is 0 V. A fixed voltage V$_{PLL}$ is applied to the plate lines PL$_1$ to PL$_3$ regardless of selection or non-selection of block erasure, but V$_{PLL}$ may be applied to the plate lines PL$_1$ to PL$_3$ of selected blocks, and V$_{SS}$ may be applied to the plate lines PL$_1$ to PL$_3$ of non-selected blocks. As voltage settings of the signal lines are controlled in this way, all the logical storage data of "1" and "0" accumulated in the floating body FB of each memory cell turn to "0." Therefore, the logical storage data does not depend on the written state "1" or the erased state "0." The potential of the semiconductor base material 7 of the floating body in an erased state "0" becomes V$_{ERA}$+Vb. Here, for example, if V$_{ERA}$=−3 V and Vb=0.7 V, the potential of the semiconductor base material 7 of the floating body is −2.3 V. Note that Vb is the built-in voltage of the pn junction between the N$^+$ layer to become the source line SL and the semiconductor base material 7 of the floating body and is approximately 0.7 V. When the semiconductor base material is negatively biased to −2.3 V, the threshold voltage of the second n-channel MOS transistor region to which the word line WL is inputted increases due to a back bias effect.

Erasure is performed in units of memory blocks, requiring a cache memory for use to temporarily store memory block data and a table of conversion between logical addresses and physical addresses of the memory blocks, and the cache memory and the conversion table may be provided either in the dynamic flash memory device or in a system that handles the cache memory and the conversion table.

(Feature)

In the dynamic flash memory cell according to the third embodiment of the present invention, the source lines SL and other control lines such as the word lines WL, bit lines BL, and plate lines PL can be controlled independently on a block by block basis. This makes it easy to select blocks to be subjected to block erasure and blocks not to be subjected to block erasure, and possible to erase only the blocks to be subjected to block erasure.

Fourth Embodiment

Block rewrite and block erase operations of the dynamic flash memory cell according to the fourth embodiment will be described with reference to FIGS. 9A to 9D.

In FIG. 9A, correspondence between data stored at logical-physical block addresses and physical block addresses of the dynamic flash memory is always managed by a controller circuit (which is an example of a "controller circuit" described in Claims) 33 and a logical-physical block address conversion lookup table circuit (abbreviated to logical-physical conversion table (which is an example of a "logical-physical conversion table" described in Claims)) 32. This is because in the dynamic flash memory, as with the flash memory, data in blocks are rewritten using already erased blocks, making it necessary to constantly manage correspondence between logical block addresses and physical block addresses. The controller circuit 33 and the logical-physical conversion table 32 may be provided in the chip of the dynamic flash memory, but may alternatively be provided outside the chip as shown in FIG. 9A. Commands from the logical-physical conversion table 32 are inputted to a block address decoder circuit 34 and blocks to be rewritten or erased are selected from blocks BLK00 to BLK33.

An erase operation that follows rewriting of storage data will be concretely described using FIGS. 9B, 9C, and 9D. In FIG. 9B, of 4×4=16 blocks BLK00 to BLK33 of the dynamic flash memory, blocks BLK01 and BLK13 have already been erased and the other blocks store data. Suppose, for example, a command to rewrite storage data of the block BLK21 is issued by the controller circuit 33. First, the controller circuit 33 searches for erased blocks by referring to the logical-physical conversion table 32. Next, the controller circuit 33 finds a desired erased block BLK01.

Subsequently, as shown in FIG. 9C, data not to be rewritten in the block BLK21 to be rewritten is copied to the erased block BLK01 and page data on the word line WL to be rewritten is newly written to the block BLK01.

Subsequently, as shown in FIG. 9D, when data copy from the block BLK21 to the block BLK01 and writing of the new data in the block BLK01 are finished, old storage data in the block BLK21 undergoes block erasure. Then, the physical block BLK01 is registered in the logical-physical conversion table 32 via the controller circuit 33.

Whereas in FIGS. 9B, 9C, and 9D, after selection of one block BLK21, when data copy from the block BLK21 to the block BLK01 and writing of the new data in the block BLK01 are finished, the old storage data in the block BLK21 undergoes block erasure, multiple blocks may be selected and subjected to block erasure simultaneously.

Note that the flash memory, which performs operations similar to the block rewriting and block erasure described in FIGS. 9B, 9C, and 9D, additionally monitors and manages the number of rewrites on a block by block basis using the controller circuit. With the flash memory, electrons accumulated in a storage node are taken in and out through a tunnel oxide film by the application of a high electric field. Therefore, service life of tunnel oxide films in terms of number of rewrites has been defined by specification. However, the dynamic flash memory cell according to the present embodiment performs rewrites in a far weaker electric field than the flash memory. This eliminates the need to specify limits on the number of rewrites on a block by block basis from the viewpoint of reliability.

Note that for block rewrite and block erase operations described in FIGS. 9B, 9C, and 9D, a cache memory (not shown) may sometimes be necessary to temporarily store storage data of blocks to be rewritten. The cache memory may be provided within or outside the chip of the dynamic flash memory according to the present embodiment.

The logical-physical conversion table 32 or the cache memory may be made up of a memory cell array which in turn is made up of dynamic flash memory cells accessible at high speed.

Besides, to maintain storage data in blocks, a refresh operation may be performed on a block by block basis. In this case, because the block at the given address is refreshed, there is no need to perform a block rewrite operation or block erase operation.

(Feature)

In spite of being a volatile memory, the dynamic flash memory cell according to the fourth embodiment can implement block rewrite and block erase operations, which are functions conventionally available only to nonvolatile flash memories, and thus can achieve greater packaging density.

Other Embodiments

Note that whereas a Si pillar is formed in the present invention, a semiconductor pillar made of a semiconductor material other than Si may be used. This similarly applies to other embodiments of the present invention.

According to the fourth embodiment, the logical-physical conversion table in FIG. 9A is provided outside the chip of the semiconductor memory device, but may be provided on-chip within the semiconductor memory device. This similarly applies to other embodiments of the present invention.

The memory element of the logical-physical conversion table in FIG. 9A according to the fourth embodiment may be made up of a dynamic flash memory accessible at high speed. This similarly applies to other embodiments of the present invention.

By providing a timer circuit for each of the blocks BLK00 to BLK33 according to the fourth embodiment in FIG. 9A, the block may be refreshed on instructions from the timer circuit. This similarly applies to other embodiments of the present invention.

In a vertical NAND-type flash memory circuit, using a semiconductor pillar as a channel, multiple stacks of memory cells made up of a tunnel oxide layer, a charge storage layer, an interlayer insulation layer, and a control conductor layer surrounding the semiconductor pillar are formed in the vertical direction. There are a source line impurity region corresponding to a source and a bit line impurity region corresponding to a drain on opposite ends of the semiconductor pillar of the memory cells. If, for one memory cell, one of memory cells on opposite sides of the memory cell is a source, the memory cell on the other side serves as a drain. In this way, the vertical NAND-type flash memory circuit is a type of SGT circuits. Thus, the present invention is applicable to a mixed circuit with a NAND-type flash memory circuit.

In "1" writing, electron-hole pairs may be generated by impact ionization phenomenon using a GIDL (Gate Induced Drain Leakage) current described in [E. Yoshida, and T. Tanaka: "A Capacitorless 1T-DRAM Technology Using Gate-Induced Drain-Leakage (GIDL) Current for Low-Power and High-Speed Embedded Memory," IEEE Transactions on Electron Devices, Vol. 53, No. 4, pp. 692-69, April 2006], and the floating body FB may be filled with the generated positive hole groups. This similarly applies to other embodiments of the present invention.

In FIG. 1, in a structure in which polarity of conductivity type of each of the $N^+$ layers 3a and 3b and p-layer Si pillar 2 is reversed, the dynamic flash memory operation is performed. In this case, in the Si pillar 2, which is n-type, majority carriers become electrons. Thus, electron groups generated by impact ionization are accumulated in the semiconductor base material 7, and a "1" state is established.

The present invention can be embodied or modified in various forms without departing from the spirit and scope of the present invention in a broad sense. Also, the embodiments described above are meant to be illustrative, and not to limit the scope of the present invention. The embodiments and variations described above can be combined as desired. Furthermore, even if some components of the embodiments described above are removed as required, the resulting inventions fall within the scope of the technical idea of the present invention.

INDUSTRIAL APPLICABILITY

The semiconductor memory cell and the semiconductor memory device according to the present invention provide a dynamic flash memory, which is a memory device that uses a high-density, high-performance SGT.

What is claimed is:

1. A semiconductor element memory cell comprising:
a first impurity well layer formed on a substrate;
a second impurity well layer formed in the first impurity well layer;
a semiconductor base material formed on the second impurity well layer in a vertical direction or extended in a horizontal direction of the substrate;
a first impurity region and a second impurity region provided on opposite ends of the semiconductor base material;
first and second gate insulating layers placed adjacent to each other in contact with a lateral surface of the semiconductor base material between the first impurity region and the second impurity region;
a first gate conductor layer covering part or all of the first gate insulating layer; and
a second gate conductor layer located adjacent to the first gate conductor layer and placed in contact with a lateral surface of the second gate insulating layer,
wherein positive hole groups, generated by an impact ionization phenomenon or by a gate-induced drain leakage current, are held in the semiconductor base material by controlling voltages applied to the first gate conductor layer, the second gate conductor layer, the first impurity region, and the second impurity region,
a memory write operation is performed by setting a voltage of the semiconductor base material to a first data retention voltage higher than a voltage of the first impurity region and/or the second impurity region, and
a memory erase operation is performed by controlling voltages applied to the first impurity region, the second impurity region, the first gate conductor layer, and the second gate conductor layer and thereby extracting a residual positive hole group out of the positive hole groups from one or both of the first impurity region and the second impurity region to set the voltage of the semiconductor base material to a second data retention voltage lower than the first data retention voltage.

2. The semiconductor element memory cell according to claim 1, wherein the substrate is a p-type semiconductor substrate, the first impurity well layer is an n-type semiconductor layer, and the second impurity well layer is a p-type semiconductor layer; and
a negative voltage is applied to the p-type second impurity well layer during the memory erase operation.

3. The semiconductor element memory cell according to claim 1, wherein first gate capacitance between the first gate conductor layer and the semiconductor base material is higher than second gate capacitance between the second gate conductor layer and the semiconductor base material.

4. The semiconductor element memory cell according to claim 1, wherein the memory erase operation is performed with respect to the semiconductor element memory cell by extracting a residual positive hole group out of the positive hole groups from one or both of the first impurity region and the second impurity region.

5. The semiconductor element memory device according to claim 1, wherein:
the first impurity region is connected to a source line, the second impurity region is connected to a bit line, and one of the first gate conductor layer and the second gate conductor layer is connected to a word line and another is connected to a drive control line; and
using voltages applied to the source line, the bit line, the drive control line, and the word line, the memory erase operation and the memory write operation are performed selectively.

6. The semiconductor element memory device according to claim 1, wherein:
a plurality of the semiconductor element memory cells is arrayed in a matrix, forming a block;
the semiconductor element memory device according to claim 1 further comprises a logical-physical conversion table configured to bring a physical address and a logical address of the block into correspondence with each other, and a controller circuit configured to manage the logical-physical conversion table; and
one or both of the logical-physical conversion table and the controller circuit is/are provided within or outside the block.

7. The semiconductor element memory device according to claim 6, wherein a block erase operation involves applying an erase voltage to all source lines in the block and thereby putting the bit line in a floating state.

8. The semiconductor element memory device according to claim 7, wherein:
at least one block is provided;
the semiconductor element memory device according to claim 7 further comprises an erase voltage generator circuit and a level conversion circuit; and
in the block erase operation, either an erase voltage outputted from the erase voltage generator circuit is applied to one or both of the first impurity region and the second impurity region in a selectively erased first block via the level conversion circuit and a residual positive hole group is extracted from the positive hole groups, thereby performing the block erase operation, or a ground voltage is applied to one or both of the first impurity region and the second impurity region in the second block which is not erased selectively, via the level conversion circuit, thereby not performing the block erase operation.

9. The semiconductor element memory device according to claim 1, wherein one or both of the first gate conductor layer and the second gate conductor layer are divided into two or more separate gate conductor layers in planar view or in a vertical direction and the separate gate conductor layers are operated synchronously or asynchronously.

10. The semiconductor element memory device according to claim 9, wherein in the vertical direction, either the separate gate conductor layers of the first gate conductor layer are placed on opposite sides of the second gate conductor layer, or the separate gate conductor layers of the second gate conductor layer are placed on opposite sides of the first gate conductor layer.

11. The semiconductor element memory device according to claim 7, wherein the source lines are connected commonly in the block to perform the block erase operation.

* * * * *